United States Patent
Mirza et al.

(10) Patent No.: US 9,763,029 B2
(45) Date of Patent: Sep. 12, 2017

(54) BLUETOOTH INTERNET OF THINGS SENSOR NETWORK

(71) Applicant: Verizon Patent and Licensing Inc., Arlington, VA (US)

(72) Inventors: Momin Mirza, Santa Clara, CA (US); Sai Sarath Chandra Yagnyamurthy, Bridgewater, NJ (US); David J. Strumwasser, Branchburg, NJ (US); Samir S. Vaidya, Highland Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 5 days.

(21) Appl. No.: 14/835,812

(22) Filed: Aug. 26, 2015

(65) Prior Publication Data

US 2017/0064491 A1 Mar. 2, 2017

(51) Int. Cl.
| | |
|---|---|
| H04W 4/00 | (2009.01) |
| H04L 12/26 | (2006.01) |
| H04W 4/02 | (2009.01) |
| H04W 4/06 | (2009.01) |
| H04L 29/08 | (2006.01) |

(52) U.S. Cl.
CPC ........... H04W 4/008 (2013.01); H04L 43/106 (2013.01); H04L 67/34 (2013.01); H04W 4/005 (2013.01); H04W 4/021 (2013.01); H04W 4/06 (2013.01)

(58) Field of Classification Search
CPC ..... H04W 4/008; H04W 4/005; H04W 4/021; H04W 4/06; H04L 43/106; H04L 67/34
USPC ........................................................ 455/414.2
See application file for complete search history.

(56) References Cited

U.S. PATENT DOCUMENTS

| | | | | |
|---|---|---|---|---|
| 2012/0093087 | A1* | 4/2012 | Chen .................... | H04L 45/025 370/328 |
| 2016/0147506 | A1* | 5/2016 | Britt ........................ | G06F 8/36 717/107 |
| 2016/0149767 | A1* | 5/2016 | Britt ........................ | H04L 41/22 715/727 |
| 2016/0150021 | A1* | 5/2016 | Britt ..................... | H04W 4/008 709/219 |
| 2016/0180100 | A1* | 6/2016 | Britt ..................... | H04W 4/008 726/27 |
| 2016/0182459 | A1* | 6/2016 | Britt ................... | H04L 63/0428 713/171 |
| 2016/0195859 | A1* | 7/2016 | Britt ....................... | G05B 15/02 700/275 |
| 2016/0195881 | A1* | 7/2016 | Britt ....................... | G08C 17/02 700/276 |

(Continued)

*Primary Examiner* — Nathan Taylor

(57) ABSTRACT

A mobile device executes an application installed on the mobile device to detect transmissions of broadcasted advertising packet data units (PDUs) via a short range wireless protocol. The mobile device receives a first broadcasted advertising PDU via the short range wireless protocol from a first Internet of Things (IoT) device, and the application determines a first geo-location associated with the first IoT device and generates a first timestamp based on receipt of the first broadcasted advertising PDU. The application at the mobile device forwards, via a wireless protocol that is different than the short range wireless protocol, the first broadcasted advertising PDU, the first geo-location, and the first timestamp to a remote data server.

20 Claims, 14 Drawing Sheets

(56) References Cited

U.S. PATENT DOCUMENTS

| | | | |
|---|---|---|---|
| 2016/0197769 A1* | 7/2016 | Britt | H04L 41/0604 709/223 |
| 2016/0197772 A1* | 7/2016 | Britt | H04W 4/008 370/254 |
| 2016/0197786 A1* | 7/2016 | Britt | H04L 41/0893 370/255 |
| 2016/0197798 A1* | 7/2016 | Britt | H04W 4/005 370/254 |
| 2016/0198465 A1* | 7/2016 | Britt | H04W 4/008 455/450 |
| 2016/0198536 A1* | 7/2016 | Britt | H02J 7/0042 315/149 |
| 2016/0291615 A1* | 10/2016 | Zakaria | G05D 23/1917 |
| 2016/0292938 A1* | 10/2016 | Zakaria | G07C 9/00571 |
| 2016/0294828 A1* | 10/2016 | Zakaria | H04L 41/0886 |
| 2016/0295364 A1* | 10/2016 | Zakaria | H04W 4/023 |
| 2016/0295616 A1* | 10/2016 | Zakaria | H04W 4/003 |
| 2016/0323156 A1* | 11/2016 | Zakaria | H04L 43/04 |
| 2016/0345516 A1* | 12/2016 | Britt | A01G 25/167 |
| 2016/0353305 A1* | 12/2016 | Zakaria | H04W 24/10 |
| 2017/0004692 A1* | 1/2017 | Britt | |
| 2017/0005390 A1* | 1/2017 | Zakaria | |
| 2017/0005820 A1* | 1/2017 | Zimmerman | |
| 2017/0006003 A1* | 1/2017 | Zakaria | |
| 2017/0006411 A1* | 1/2017 | Zakaria | |
| 2017/0006595 A1* | 1/2017 | Zakaria | |
| 2017/0006643 A1* | 1/2017 | Zakaria | |

* cited by examiner

US 9,763,029 B2

BLUETOOTH INTERNET OF THINGS SENSOR NETWORK

BACKGROUND

Bluetooth is a wireless standard (standardized as IEEE 802.15.1) that a wireless device uses to send and/or receive data over short distances, such as distances less than ten meters, but possibly up to one hundred meters. Bluetooth uses short-wavelength Ultra-High Frequency radio waves from 2.4 to 2.485 GHz to communicate over short ranges. Bluetooth is a wire replacement communications protocol designed for low-power consumption using low-cost transceiver microchips in the wireless device. The range of a Bluetooth enabled wireless device is power class dependent, with different power classes being used for different applications and having different effective ranges. A Bluetooth-enabled wireless device with a class 3 power classification has a range of up to one meter, a class 2 power classification (most commonly found in mobile devices) has a range of 5-10 meters, and a class 1 power classification (primarily used in industrial applications) has a range of 20-100 meters. The effective range of a Bluetooth-enabled device varies due to many different factors such as, for example, propagation conditions, antenna configuration, and battery conditions. Bluetooth may be used for establishing a wireless personal area network (WPAN) with another device for communicating data with the other device over short ranges.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein use a short range wireless protocol and advertising packet data units (PDUs) for broadcasting sensor data from numerous IoT devices, located at various different locations, where mobile devices receive the broadcasted advertising PDUs and forward the advertising PDUs to a remote data storage device. The IoT devices include one or more sensors that, either continuously or at periodic or aperiodic intervals, sense aspects of the environment proximate to the IoT devices and generate corresponding sensor data. The sensed aspects of the environment may include, for example, ambient humidity, ambient air temperature, local wind speed, barometric pressure, power usage, or visual images of a certain location (e.g., a traffic camera). The IoT devices insert the sensor data in one or more advertising PDUs, and broadcast the advertising PDUs using the short range wireless protocol. The IoT devices may each include any type of device that includes a transceiver, which implements the short range wireless protocol, and one or more sensors.

The mobile devices may be located within range of the short range wireless protocol, or may be moved within range, so as to receive the transmitted advertising PDU(s). An application installed at the mobile devices automatically and transparently receives the one or more broadcast advertising PDUs via the short range wireless protocol, timestamps the PDU(s), and determines a geographic location (e.g., using Global Positioning System (GPS)) associated with the broadcasting IoT device. The application at the mobile devices packages the one or more broadcasting advertising PDUs, the timestamp, and the determined geographic location, in a message (e.g., a variable length packet), and transmits the message to the remote storage device via a wireless protocol that is different than the short range wireless protocol (e.g., Wi-Fi or a cellular network protocol). The remote storage device receives the messages, including the forwarded advertising PDUs, from numerous mobile devices, unpacks the contents of the messages, and stores the unpacked contents of the messages in a database for future retrieval. Large quantities of sensor data, from numerous different locations and numerous different IoT devices, may, therefore, be aggregated at the remote storage device for easy access, analysis and retrieval.

Figure 1:
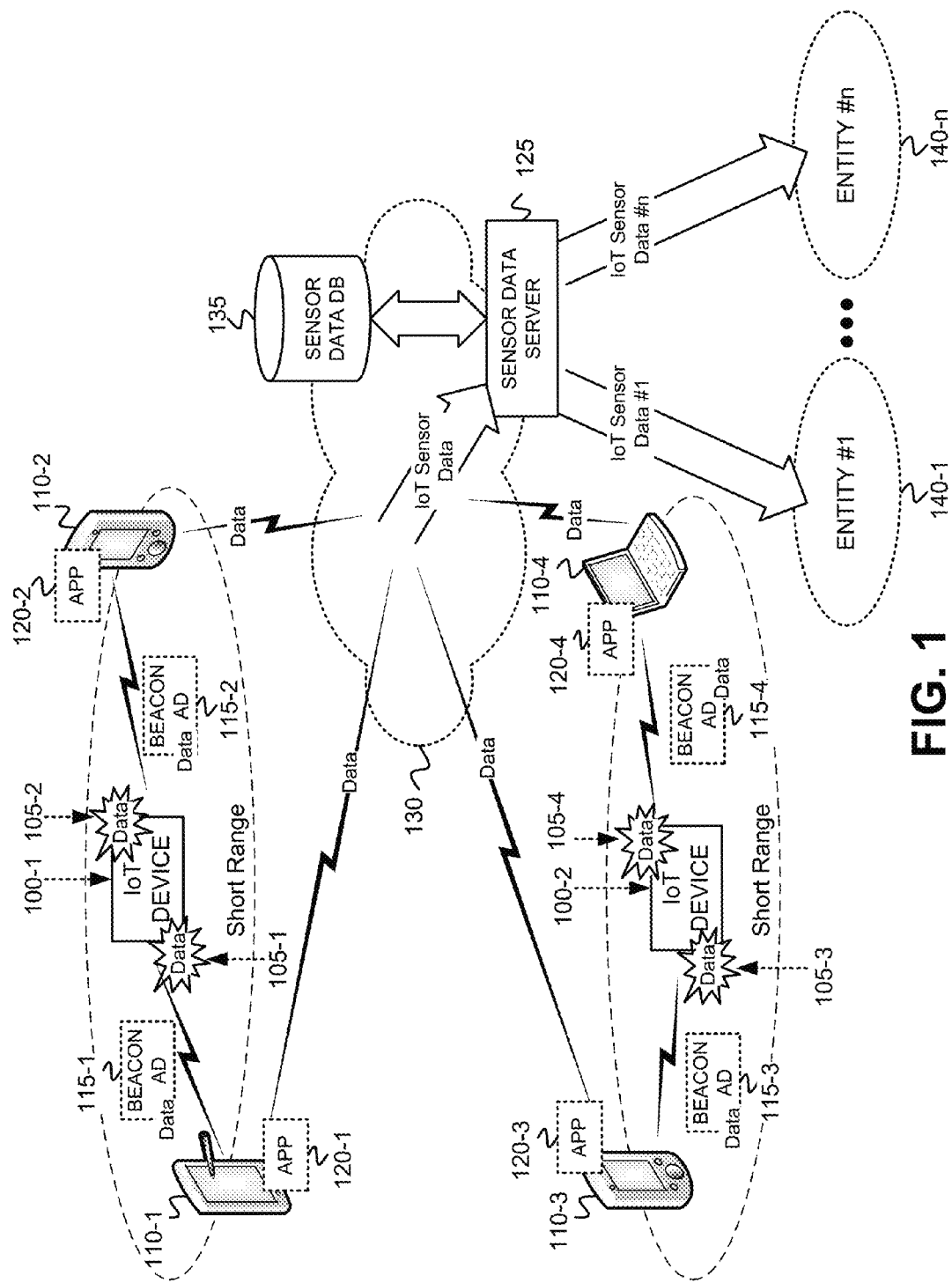
FIG. 1 is a diagram that depicts an overview of the use of advertising packet data units for carrying sensor data from Internet of Things (IoT) devices for receipt by mobile devices that move within proximity to the IoT devices.

FIG. 1 is a diagram that depicts an overview of the use of advertising PDUs, transmitted using a short range wireless protocol, for carrying sensor data from IoT devices, that sense aspects of their environment, for receipt by mobile devices that are within a certain proximity to the IoT devices. In one implementation, the short range wireless protocol may include the Bluetooth wireless protocol. The sensor data may be generated by one or more sensor components at the IoT devices including, for example (but not limited to), environmental sensors, power meters or cameras. The sensor data includes data related to a sensed environmental parameter or condition at an IoT device such as, for example, temperature data, humidity data, barometric pressure data, wind speed data, power usage data, or image data (e.g., JPEG, TIFF, GIF, BMP, PNG, etc.). The sensor data may include any type of data related to a parameter detected by a sensor at a respective IoT device, or any type of data related to the operation of the respective IoT device. The sensor data may be encoded using a known method of encoding such that the sensor data may be decoded by app 120 or by sensor data server 125.

As shown, a first IoT device 100-1 may obtain sensor data 105-1 and 105-2, either at the same time instance or at different time instances, and may broadcast the sensor data 105-1 and 105-2 to mobile devices, such as mobile devices 110-1 and 110-2 depicted in FIG. 1, that are currently within, or have moved within, a short range (e.g., 5 meters) of IoT device 100-1. IoT device 100-1 may broadcast sensor data 105-1, using the short range wireless protocol, in an advertising PDU 115-1, and PDU 115-1 may be received by application (app) 120-1 at mobile device 110-1. IoT device 100-1 may broadcast sensor data 105-2, using the short range wireless protocol, in an advertising PDU 115-2, and PDU 115-2 may be received by app 120-2 at mobile device 110-2. Advertising PDU 115-1 and 115-2 may each include a Bluetooth advertising PDU such as a Bluetooth ADV_IND PDU, a Bluetooth ADV_DIRECT_IND PDU, a Bluetooth ADV_NONCONN_IND PDU, or a Bluetooth ADV_S-CAN_IND PDU defined by the Bluetooth specification (e.g., Bluetooth 4.0 core). The ADV_IND PDU includes an advertising PDU transmitted for a connectable undirected advertising event. The ADV_DIRECT_IN PDU includes an advertising PDU transmitted for a connectable directed advertising event. The ADV_NONCONN_IND PDU includes an advertising PDU transmitted for a non-connectable undirected advertising event. The ADV_NONCONN_IND PDU is further compatible with the Apple ibeacon specification. The ADV_SCAN_IND PDU includes an advertising PDU transmitted for a undirected advertising event.

App 120-1 at mobile device 110-1, upon receipt of PDU 115-1, may timestamp PDU 115-1 and may obtain a geographic location associated with IoT device 100-1. App 120-1 at mobile device 110-1 may forward PDU 115-1, along with the timestamp and the geographic location to a sensor data server 125 via a wireless connection to a network 130, where PDU 115-1 includes the sensor data 105-1 transmitted by IoT device 100-1. App 120-2 at mobile device 110-2 may also forward PDU 115-2, along with the timestamp and the geographic location, to sensor data server 125 via a wireless connection to network 130, where PDU 115-2 includes the sensor data 105-2 transmitted by IoT device 100-1.

As further shown in FIG. 1, a second IoT device 100-2 may obtain sensor data 105-3 and 105-4, either at the same time instance or at different time instances, and may broadcast the sensor data 105-3 and 105-4 to mobile devices, such as mobile devices 110-3 and 110-4 depicted in FIG. 1, that are currently within, or have moved within, a short range of IoT device 100-2. IoT device 100-2 may broadcast sensor data 105-3, using the short range wireless protocol, in an advertising PDU 115-3, and PDU 115-3 may be received by application (app) 120-3 at mobile device 110-3. IoT device 100-2 may broadcast sensor data 105-4, using the short range wireless protocol, in an advertising PDU 115-4, and PDU 115-4 may be received by app 120-4 at mobile device 110-4. App 120-4 at mobile device 110-4, upon receipt of PDU 115-4, may timestamp PDU 115-4 and may obtain a geographic location associated with IoT device 100-2. App 120-3 at mobile device 110-3 may forward PDU 115-3, along with the timestamp and the geographic location to sensor data server 125 via a wireless connection to network 130, where PDU 115-3 includes the sensor data 105-3 transmitted by IoT device 100-2. App 120-4 at mobile device 110-4 may forward PDU 115-4, along with the timestamp and the geographic location, to sensor data server 125 via a wireless connection to network 130, where PDU 115-4 includes the sensor data 105-4 transmitted by IoT device 100-2.

Though FIG. 1 has depicted only two different IoT devices 100 generating and broadcasting sensor data, numerous different IoT devices 100 may generate and broadcast sensor data via advertising PDUs. Numerous different mobile devices 110, located within a short range of those IoT devices 100, may receive the broadcast advertising PDUs and may forward the PDUs, along with timestamps and geographic location data, to sensor data server 125 via network 130. All of the forwarded advertising PDUs received at sensor data server 125 may be processed to extract certain data, including the sensor data, and the data may be stored in sensor data database (DB) 135 for future access and retrieval.

Entities 140-1 through 140-$n$ (where n is greater than or equal to one) may request access to certain types of data, associated with the sensor data broadcast by IoT devices 100, stored in sensor data DB 135. Sensor data server 125 may, on-demand or in a periodic fashion, retrieve the requested certain types of data stored in sensor data DB 135, and may provide the data to entities 140-1 through 140-$n$. In one implementation, entities 140-1 through 140-$n$ may pay an owner or operator of sensor data server 125 for access to, and retrieval of, the requested data from sensor data DB 135. Each of entities 140-1 through 140-$n$ may include, for example, an individual, a scientific group, or a company that desires access to the requested data stored in sensor data DB 135.

Figure 2:
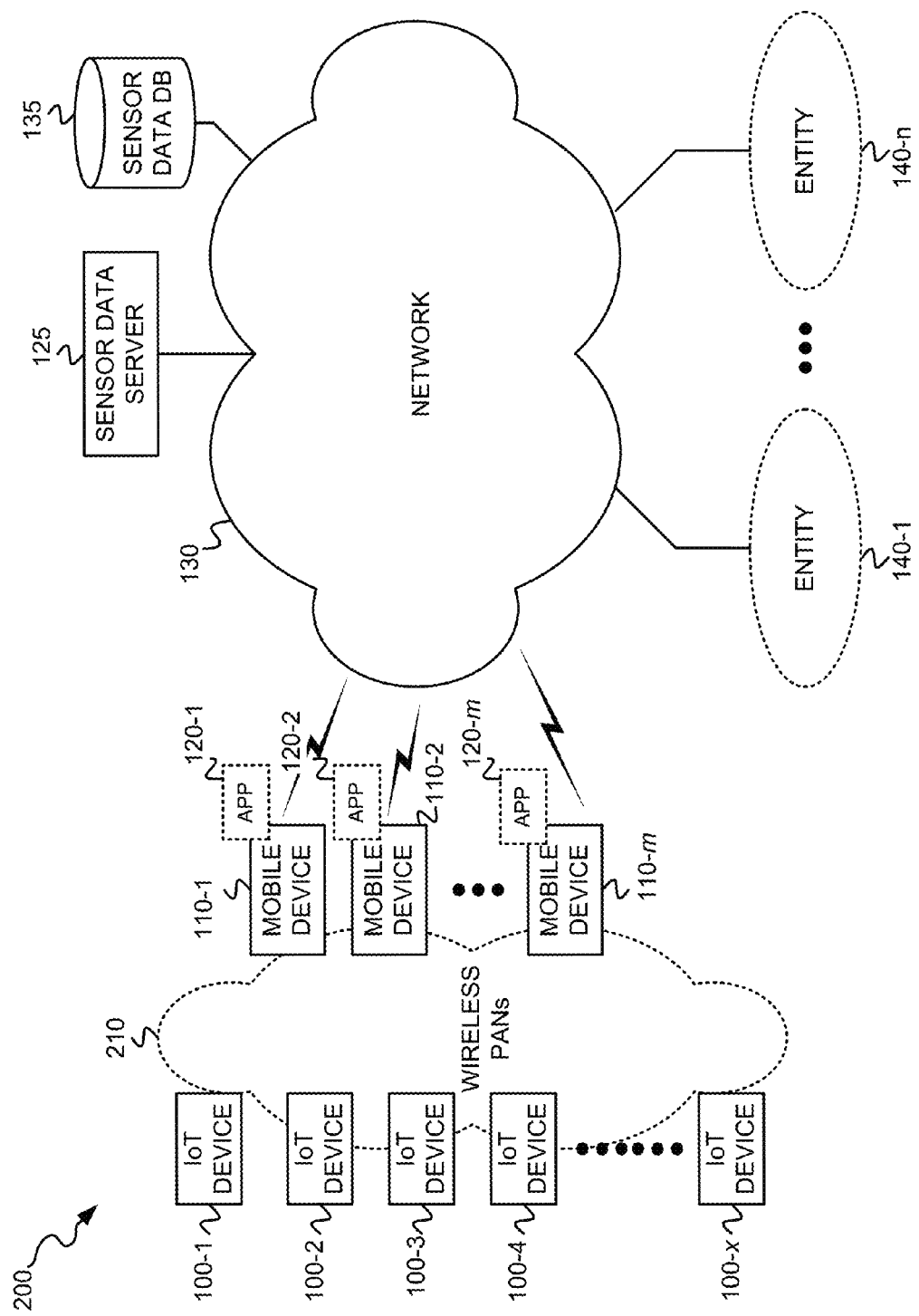
FIG. 2 is a diagram that depicts an exemplary network environment in which advertising packet data units are broadcast for carrying sensor data from IoT devices that sense aspects of their environment.

FIG. 2 is a diagram that depicts an exemplary network environment 200 in which advertising PDUs are broadcast, using a short range wireless protocol, for carrying sensor data from IoT devices that sense aspects of their environment. Network environment 200 includes multiple IoT devices 100-1 through 100-$x$ (where x is a positive integer greater than one), multiple mobile devices 110-1 through 110-$m$ (where m is a positive integer greater than or equal to one), a wireless personal area network(s) (PAN(s)) 210, network 130, sensor data server 125, sensor data DB 135 and multiple entities 140-1 through 140-$n$ (where n is a positive integer greater than or equal to one).

IoT devices 100-1 through 100-$x$ (generically referred to herein individually as "IoT device 100" or collectively "IoT devices 100") may each include a physical object or device that further includes a processing unit, one or more sensors for sensing aspects of the IoT device's environment, and a short range wireless transceiver capable of communicating via a short range wireless protocol (e.g., Bluetooth, Insteon, Infrared Data Association (IrDA), wireless Universal Serial Bus (USB), Z-Wave, ZigBee, Body Area Network (BAN)). IoT device 100 generates, as described herein, sensor data from the one or more sensors and broadcasts the sensor data, via one or more advertising PDUs, using the short range wireless protocol such that at least one of mobile devices 110-1 through 110-$m$ may receive the advertising PDUs.

Mobile devices 110-1 through 110-*m* (generically referred to herein individually as "mobile device 110" or collectively as "mobile devices 110") may each include any type of electronic device that includes a first wireless transceiver capable of communicating via the short range wireless protocol, and a second wireless transceiver capable of communicating wireless via network 130 (e.g., via IEEE 802.11 standard). The first wireless transceiver may include a transceiver that uses one or more short range wireless protocols for communicating, including Bluetooth, Insteon, IrDA, Wireless USB, Z-Wave, ZigBee, and/or BAN. The second wireless transceiver may include, for example, a Wi-Fi transceiver for communicating with a Wi-Fi wireless LAN that is a component of network 130, and/or a cellular transceiver for communicating with a PLMN that is a component of network 130. Mobile device 110 may include, for example, a cellular telephone (e.g., a smart phone), a personal digital assistant (PDA); a palmtop, laptop, or tablet computer; a media playing device; a game playing device, or a digital camera device. Mobile devices 110-1 through 110-*m* may each store and execute a respective one of apps 120-1 through 120-*m* (generically referred to herein as "app 120" or "apps 120"). Apps 120 may execute processes, such as that described with respect to FIGS. 9A and 9B below. Mobile devices 110 may download a respective app 120 from a remote network device such as, for example, sensor data server 125, and may install app 120 for execution.

Wireless PAN(s) 210 includes any type of personal area network carried over a low power, short range wireless protocol such as, for example, Bluetooth, Insteon, IrDA, Wireless USB, Z-Wave, ZigBee, and/or BAN. Wireless PAN(s) 210 may include a single PAN between each IoT device 100 and a respective mobile device 110 for transmitting data between them. The reach of each wireless PAN(s) 210 varies from a few centimeters to tens of meters, depending on the specific short range wireless protocol used.

Sensor data server 125 includes one or more network devices that receive forwarded advertising PDUs, and associated data, from mobile devices 110-1 through 110-*m*, and store data from the PDUs in sensor data DB 135. Sensor data server 125 may also retrieve requested sensor data stored in sensor data DB 135 based on requests from entities 140-1 through 140-*n*.

Sensor data DB 135 may include one or more network devices that include memory configured to store data in a data structure, such as the exemplary tabular data structure described below with respect to FIG. 5. Sensor data server 125 may index the data structure, using one or more search parameters such as MAC address, timestamp, location, and/or data type, to retrieve specific sensor data originally broadcast from IoT devices 100.

Network 130 includes one or more networks of any type, such as, for example, a "Wi-Fi" network (i.e., a wireless network compatible with the IEEE 802.11 standard), a telecommunications network (e.g., a Public Switched Telephone Network (PSTN) or Public Land Mobile Network (PLMN)), a local area network (LAN), a wide area network (WAN), a metropolitan area network (MAN), an intranet, the Internet, a wireless satellite network, and/or a cable network (e.g., an optical cable network). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Entities 140-1 through 140-*n* (generically referred to herein individually as "entity 140" or collectively as "entities 140") may include a person, a group (e.g., a scientific group), or a company that desires to have access to sensor data, and other associated data, stored in sensor data DB 135.

The configuration of the components of network environment 200 depicted in FIG. 2 is for illustrative purposes only and other configurations may be implemented. Therefore, network environment 200 may include additional, fewer and/or different components, that may be configured differently, than depicted in FIG. 2.

Figure 3:
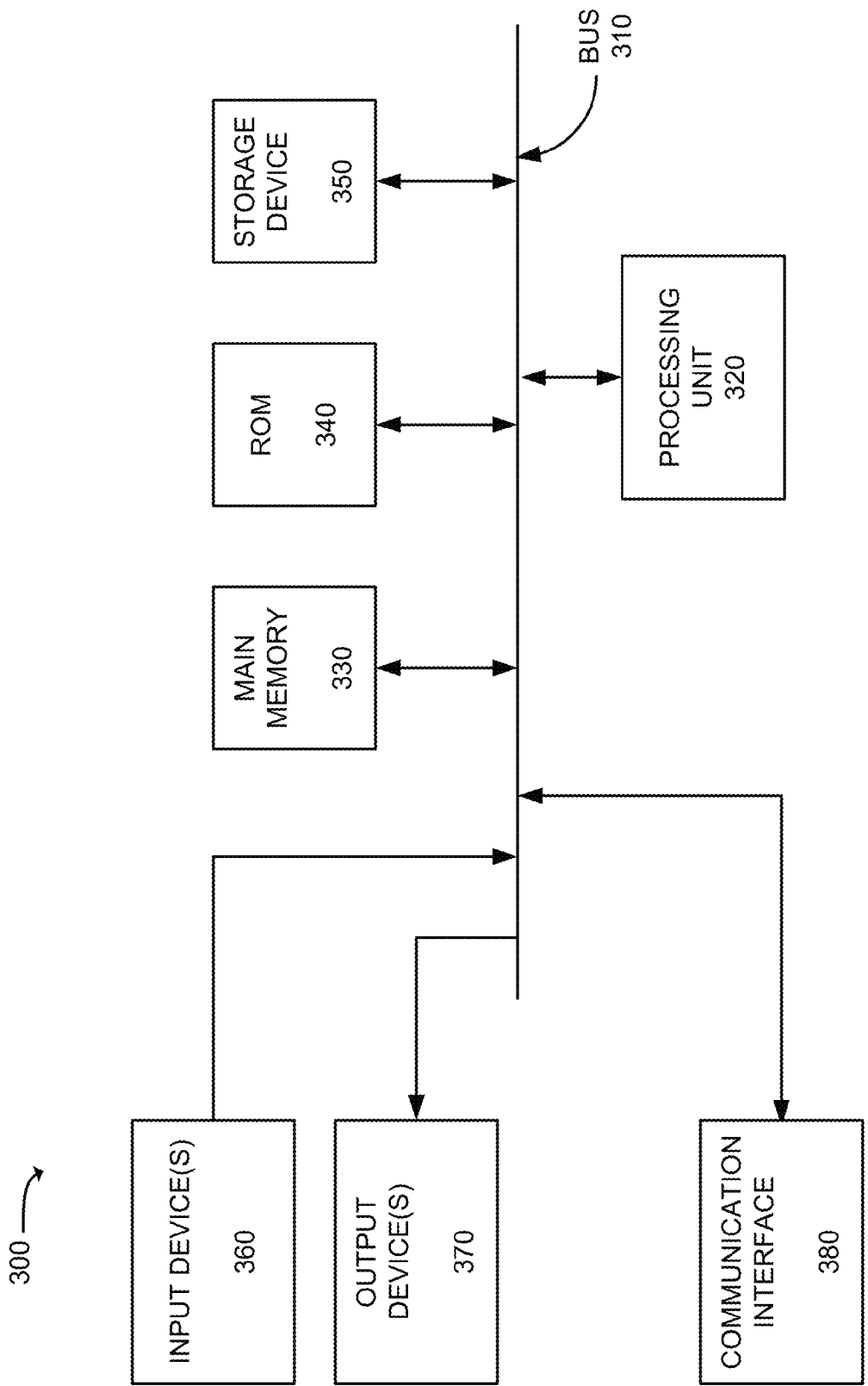
FIG. 3 is a diagram of exemplary components of a device 300 that may correspond to the mobile device, the sensor data server, the sensor data database, and/or IoT device of FIG. 2.

FIG. 3 is a diagram of exemplary components of a device 300. Mobile device 110, sensor data server 125, sensor data DB 135, and IoT device 100 may each include the same, or similar components, in a same or similar configuration to that depicted in FIG. 3. Device 300 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of device 300.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device(s) 360 may include one or more mechanisms that permit an operator to input information to device 300, such as, for example, a keypad or a keyboard, a touch panel display, voice recognition and/or biometric mechanisms, etc. Output device(s) 370 may include one or more mechanisms that output information to the operator, including a display, a speaker, etc. Communication interface 380 may include any transceiver mechanism that enables device 300 to communicate with other devices and/or systems. For example, communication interface 380 may include mechanisms for communicating with another device or system via a network, such as network 130.

Device 300 may perform certain operations or processes, as may be described in detail below. Device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. Main memory 330, ROM 340, and storage device 350 may each be referred to herein as a "tangible non-transitory computer-readable medium."

The software instructions may be read into main memory 330 from another computer-readable medium, such as storage device 350, or read into main memory 330 from another device via communication interface 380. The software instructions contained in main memory 330 may cause processing unit 320 to perform operations or processes that will be described later. Alternatively, hardwired circuitry may be used in place of or in combination with software instructions to implement processes described herein. Thus, exemplary implementations are not limited to any specific combination of hardware circuitry and software.

The configuration of components of device 300 illustrated in FIG. 3 is for illustrative purposes only and other configurations may be implemented. Therefore, device 300 may include additional, fewer and/or different components, arranged in a different configuration, than depicted in FIG. 3. For example, if device 300 is an IoT device 100, then device 300 may not include input device(s) 360, output device(s) 370, and storage device 350, and communication interface 380 may include a wireless transceiver that communicates based on a short range wireless protocol, such as, for example, Bluetooth, Insteon, IrDA, Wireless USB, Z-Wave, ZigBee, and/or a BAN. Additionally, IoT device 100 may further include one or more sensors (not shown), connected to bus 310, that generate data associated with the sensed environment proximate to IoT device 100. For example, the one or more sensors may include a humidity sensor, a temperature sensor, a barometric pressure sensor, a wind speed sensor, and/or a digital camera. The one or more sensors may include any type of sensor that may sense environmental parameters proximate to IoT device 100, and generate sensor data corresponding to those sensed environmental parameters.

Additionally, if device 300 is a mobile device 110, then communication interface 380 of device 300 may include multiple communication interfaces, such as, for example, a first wireless transceiver that communicates using a low power, short range wireless protocol (e.g., Bluetooth, Insteon, IrDA, Wireless USB, Z-Wave, ZigBee, and/or a Body Area Network), and a second wireless transceiver that communicates using a Wi-Fi or a wireless cellular network protocol (e.g., LTE, CDMA, GSM, etc.). Also, if device 300 is a mobile device 110, then device 300 may further include a geographic location determining component such as, for example, a Global Positioning System (GPS) component, connected to bus 310, that can determine a geographic location of mobile device 110 at any particular instance of time.

Figure 4:
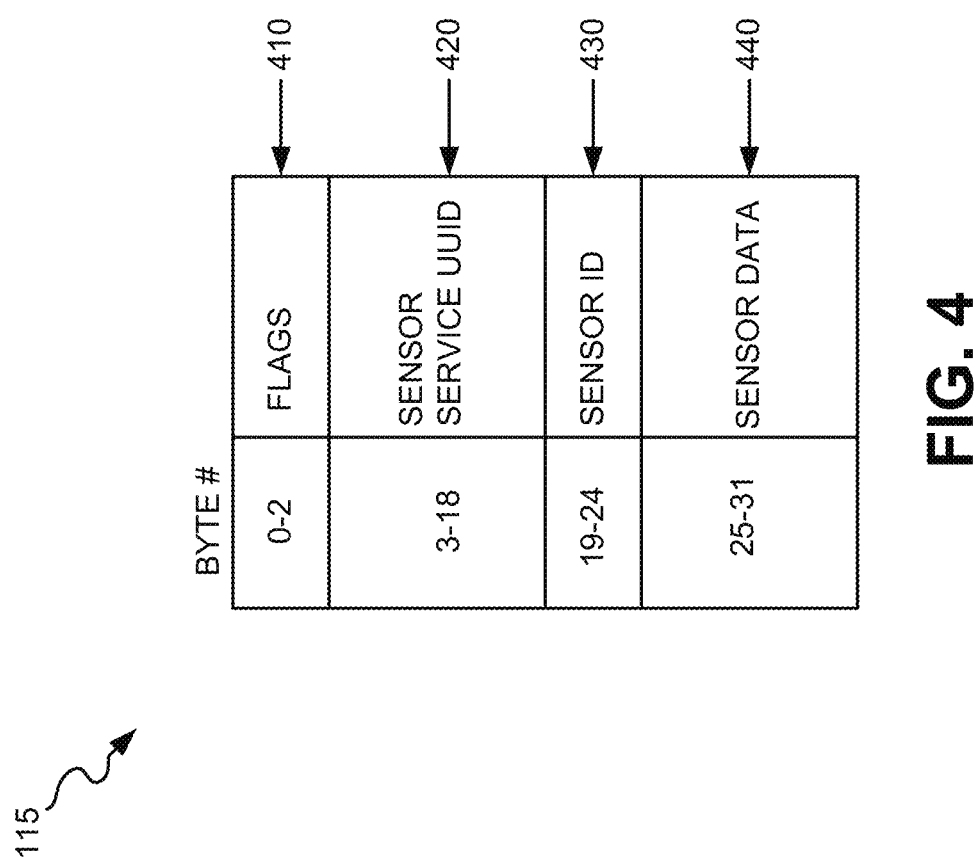
FIG. 4 depicts an advertising packet data unit, used for sending sensor data from IoT devices, according to an exemplary implementation.

FIG. 4 depicts an advertising PDU 400 according to an exemplary implementation. Advertising PDU 400 may include a fixed length frame of data that further includes multiple fields of bytes, with each of the fields having a specific quantity of bytes of a certain type of data. In the exemplary implementation shown in FIG. 4, advertising PDU 400 includes 32 bytes of data. In other implementations, a different quantity of data bytes may be used.

Advertising PDU 400 may include a flags field 410, a sensor service universally unique identifier (UUID) field 420, a sensor identifier (ID) field 430, and a sensor data field 440. Flags field 410 may include 3 bytes (bytes 0-2) that include one or more flags that may be set or cleared for various purposes. Sensor service UUID field 420 may include 16 bytes (bytes 3-18) that specify a UUID.

Sensor ID field 430 may include 5 bytes (bytes 19-24) that uniquely identify the IoT device 100. In one implementation, a Medium Access Control (MAC) address (e.g., Bluetooth MAC address) may be assigned to each IoT device 100, and the IoT device 100 may insert the MAC address into sensor ID field 430 when sending an advertising PDU. In additional implementations, a data type indicator, that indicates a type of the sensor data being inserted into the data payload, may be inserted within sensor ID field 430. For example, a routing code may be inserted in sensor ID field 430, where the routing code may include the IoT device's MAC address prefixed with a prefix that includes the data type indicator. In one example, the prefix "AAAA" may indicate temperature sensor data, the prefix "BBBB" may indicate humidity sensor data, and the prefix "CCCC" may indicate barometric pressure sensor data.

Sensor data field 440 may include 6 bytes (bytes 25-31) that include the sensor data inserted into advertising PDU 115. In some instances, the sensor data inserted in sensor data field 440 may include a single block of sensor data associated with a single sensor measurement performed at IoT device 100. In other instances, the sensor data inserted in sensor data field 440 may include only a portion of a single block of sensor data associated with a single sensor measurement, where the sensor data includes a quantity of data that is too large to fit into sensor data field 440 of a single PDU 115. In such instances, the sensor data is divided into multiple portions of sensor data, and then distributed among a sufficient number (i.e., N) PDUs to contain the entirety of all of the data of the sensor data. In further implementations, the sensor data may be obfuscated, using a series of logical operations and/or bit shifts, to obscure the sensor data prior to the sensor data being inserted into field 440 of PDU 115. In even further implementations, in addition to obfuscating the sensor data, or as an alternative to obfuscation, the sensor data may be encrypted using various different types of encryption algorithms. In one example, AES128 encryption, using a 16 byte block size, may be used to encrypt the sensor data. When using AES128 encryption, though, sensor data spanning multiple PDUs (e.g., multiple 6 byte blocks of sensor data) may be combined and encrypted as a single unit so as to satisfy the 16 byte minimum block size required by AES128 encryption. Upon encrypting as a single unit, the encrypted data may be divided into multiple blocks and distributed among a sequence of multiple, linked PDUs, and then recombined and decrypted after being broadcast by the IoT device.

The number of fields, byte size, and content of the different fields of advertising PDU 115 shown in FIG. 4 is for illustrative purposes. Other PDU frame formats, having fewer, more, and/or one or more different types of fields, than that depicted in FIG. 4 may be implemented.

Figure 5:
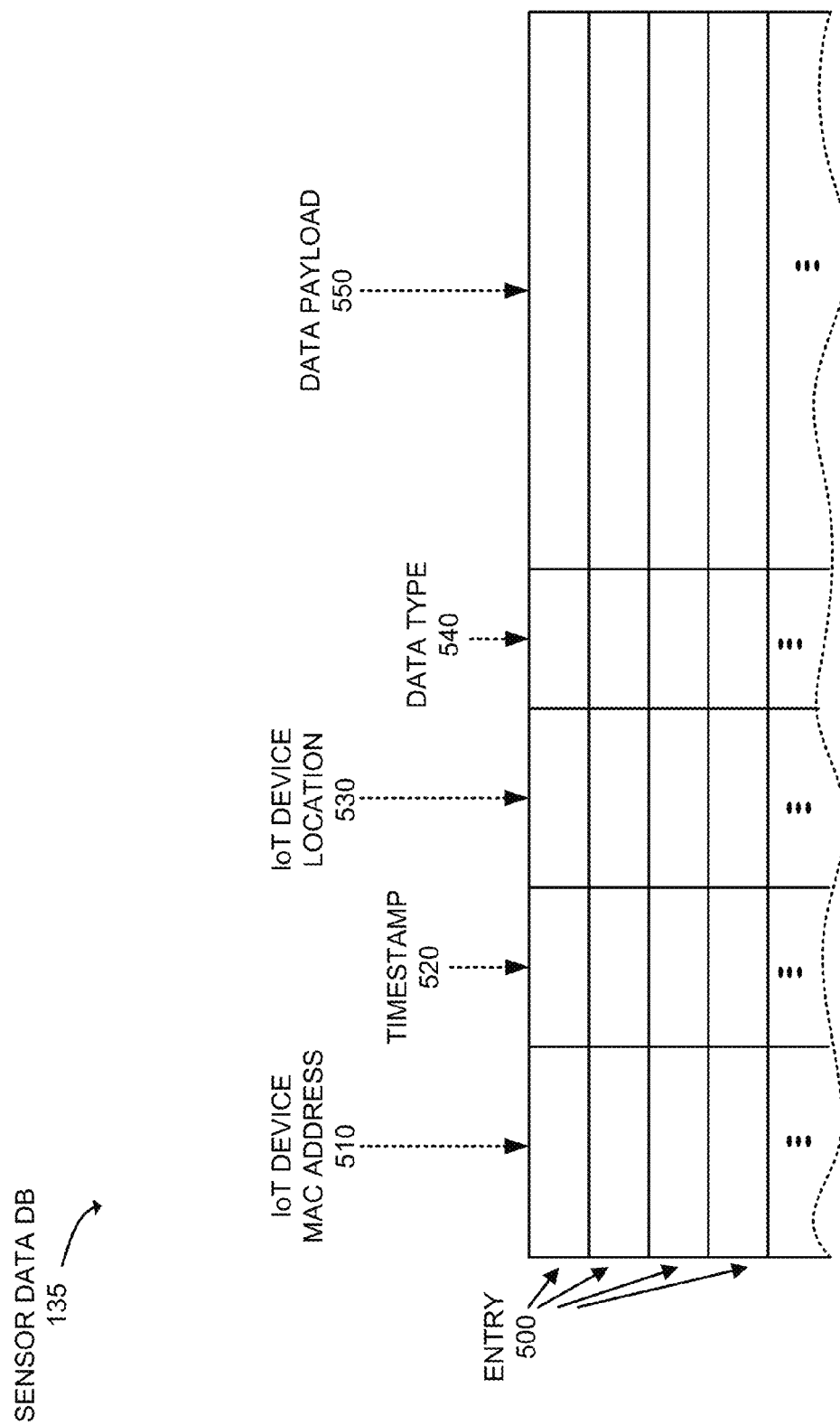
FIG. 5 depicts an exemplary data structure stored in the sensor data database of FIG. 2.

FIG. 5 depicts an exemplary data structure stored in sensor data DB 135. The data structure of sensor data DB 135 is shown in FIG. 5 as a tabular data structure. However, other types of data structures may alternatively be used. The data structure of sensor data DB 135 may include multiple entries 500, each of which includes an IoT device Medium Access Control (MAC) address field 510, a timestamp field 520, an IoT device location field 530, a data type field 540, and a data payload field 550.

IoT device MAC address field 510 stores the MAC address (e.g., Bluetooth MAC address) of an IoT device that originated the advertising PDU from which the data in entry 500 was extracted. The MAC address stored in field 510 may be extracted from the sensor ID bytes 430 of the advertising PDU 115.

Timestamp field 520 stores the timestamp generated by the mobile device 110 that received the broadcasted advertising PDU 115 from a IoT device 100. The timestamp, therefore, represents a date and time at which an advertising PDU was broadcast by the IoT device 100. IoT device location field 530 stores the geographic location data generated by the mobile device 110 that received the broadcasted advertising PDU 115 from the IoT device 100. The geographic location data may include a geographic location determined using various techniques such as, for example, using the Global Positioning System (GPS) implemented by components within mobile device 110. Since the advertising PDU 115 is broadcasted from IoT device 100 using a short range wireless protocol, the geographic location of mobile device 110 can serve as a proxy for the geographic location of the broadcasting IoT device 100.

Data type field 540 stores an indicator that indicates a data type of the sensor data stored in data payload field 550 of the same entry 500. The data type indicator may indicate that the sensor data includes temperature data, humidity data, barometric pressure data, wind speed data, or image data (e.g., an image taken by a traffic camera, an image taken by a security camera). The sensor data may include other types of data broadcasted by IoT devices 100, not specifically described here, that may relate to the environment present at each of the IoT devices 100. The data type indicator may be extracted from sensor ID bytes 430, where a data prefix is prefixed to the MAC address of the IoT device 100 and the data prefix includes a code that identifies the sensor data contained in the sensor data bytes 440 of the advertising PDU 115.

Data payload field 550 stores the sensor data sensed at an IoT device 100 and broadcast by the IoT device 100 via an advertising PDU 115. The sensor data may be extracted from the sensor data bytes 440 of one or more advertising PDUs 115, where the one or more advertising PDUs 115 are forwarded to sensor data server 125 from a mobile device 110.

The number and content of the fields of the tabular data structure of sensor data DB 135 illustrated in FIG. 5 is for illustrative purposes. Other data structures having a different structure or fewer, more, and/or one or more different types of fields may be implemented as compared to that depicted in FIG. 5.

Figure 6:
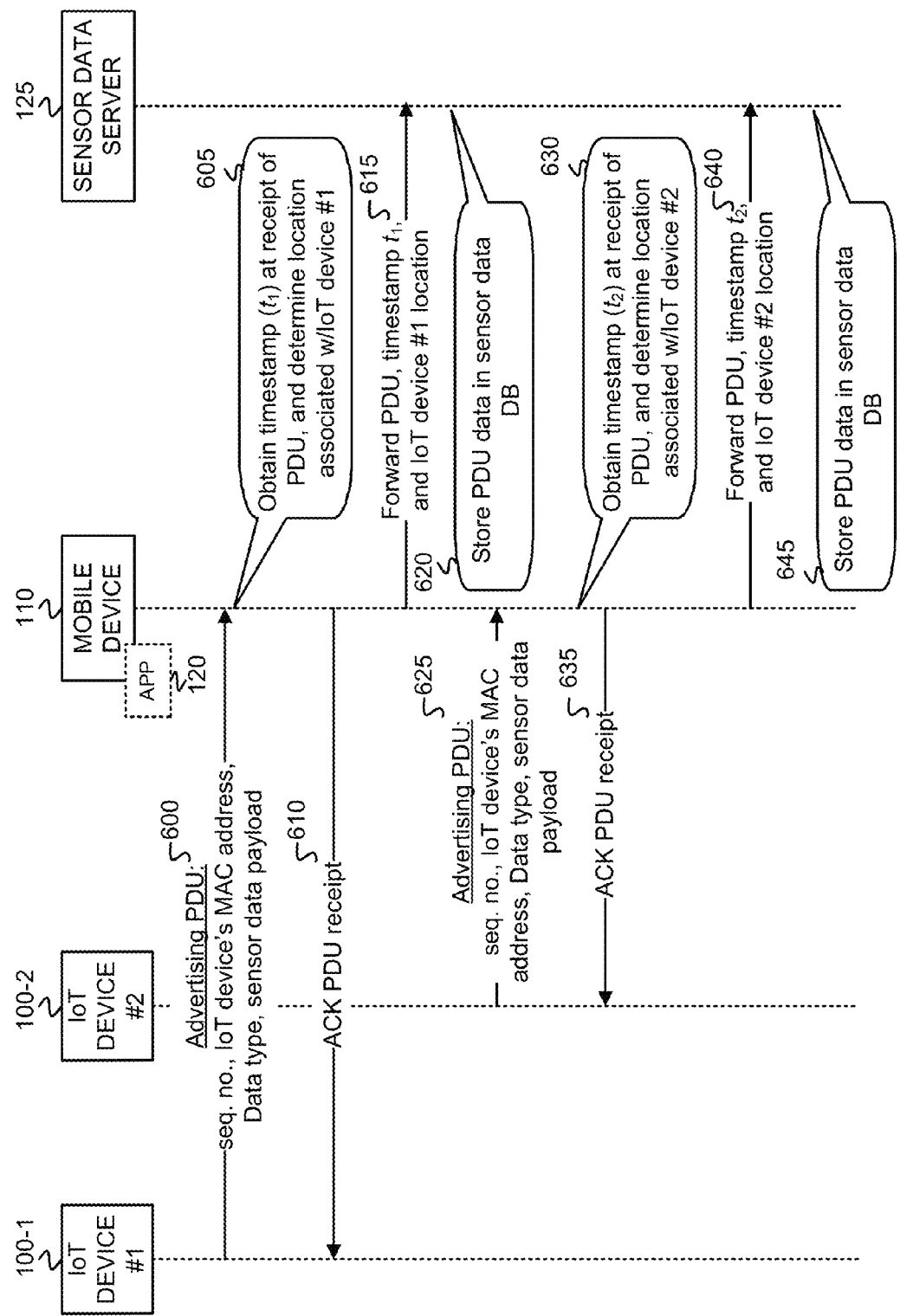
FIG. 6 is a diagram that depicts an example of messaging associated with advertising packet data units being broadcast from two different IoT devices and received at a mobile device.

FIG. 6 is a diagram that depicts an example of messaging associated with advertising PDUs being broadcast from two different IoT devices 100 and received at a mobile device 110. Only two different IoT devices 100 are shown in FIG. 6 for purposes of simplicity. In actual implementations, a single mobile device 110 may receive broadcasted advertising PDUs from numerous different IoT devices 100 depending on the location of the mobile device 110 and the particular number of IoT devices 100 disposed at or near the location of the mobile device 110.

As shown in FIG. 6, an IoT device 100-1 broadcasts an advertising PDU 600 via a short range wireless protocol (e.g., Bluetooth, etc.), where PDU 600 includes a sequence number, the MAC address of IoT device 100-1, a data type indicator, and a sensor data payload. The sensor data payload includes sensor data sensed by one or more sensors (not shown) at IoT device 100-1. Upon receipt of the broadcasted PDU 600, app 120 at mobile device 110 obtains 605 a timestamp ($t_1$), and determines a geographic location associated with IoT device 100-1. App 120 at mobile device 110 also may cause a PDU acknowledgement receipt message 610 to be transmitted to IoT device 100-1 using the short range wireless protocol. App 120 at mobile device 110 then forwards PDU 600, along with the timestamp $t_1$ and the location associated with IoT device 100-1 in a message 615 to sensor data server 125. Upon receipt of message 615, sensor data server 125 extracts and stores the PDU data in sensor data DB 135.

As further shown in FIG. 6, a second IoT device 100-2 broadcasts an advertising PDU 625 via the short range wireless protocol, where PDU 625 includes a sequence number, the MAC address of IoT device 100-2, a data type indicator, and a sensor data payload. The sensor data payload includes sensor data sensed by one or more sensors (not shown) at IoT device 100-2. Upon receipt of the broadcasted PDU 625, app 120 at mobile device 110 obtains 630 a timestamp ($t_2$), and determines a geographic location associated with IoT device 100-2. App 120 at mobile device 110 also may cause a PDU acknowledgement receipt message 635 to be transmitted to IoT device 100-2 using the short range wireless protocol. App 120 at mobile device 110 then forwards PDU 625, along with the timestamp $t_2$ and the location associated with IoT device 100-2 in a message 640 to sensor data server 125. Upon receipt of message 640, sensor data server 125 extracts and stores the PDU data in sensor data DB 135.

Figure 7:
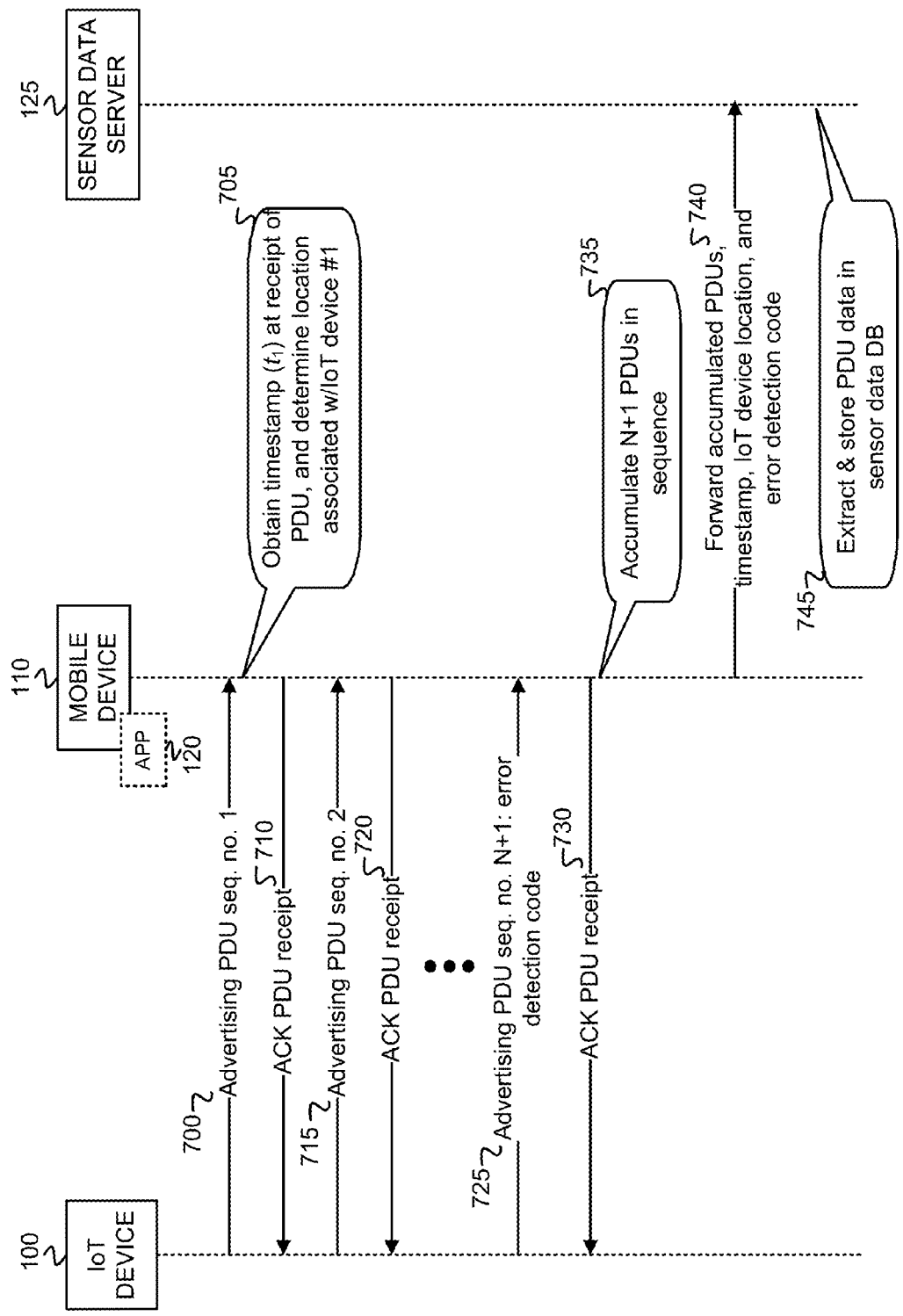
FIG. 7 is a diagram that depicts an example of a sequence of multiple advertising packet data units, containing sensor data distributed over the multiple advertising packet data units, being broadcast from an IoT device, received at a mobile device, and forwarded to a sensor data server.

FIG. 7 is a diagram that depicts an example of a sequence of multiple advertising PDUs, containing sensor data distributed over the multiple advertising PDUs, being broadcast from a IoT device 100, received at a mobile device 110, and forwarded to sensor data server 125.

As shown in FIG. 7, an IoT device 100 broadcasts a first advertising PDU 700 in a sequence of N+1 PDUs via a short range wireless protocol (e.g., Bluetooth), where PDU 700 includes a sequence number=1, the MAC address of IoT device 100, a data type indicator, and a sensor data payload. The sensor data payload includes a first portion of sensor data sensed by one or more sensors (not shown) at IoT device 100. Upon receipt of the broadcasted PDU 700, app 120 at mobile device 110 obtains 705 a timestamp ($t_1$), and determines a geographic location associated with IoT device 100. App 120 at mobile device 110 also may cause a PDU acknowledgement receipt message 710 to be transmitted to IoT device 100 using the short range wireless protocol.

IoT device 100 broadcasts a second advertising PDU 715 in the sequence of PDUs via the short range wireless protocol, where PDU 715 includes a sequence number=2, the MAC address of IoT device 100, a data type indicator, and a sensor data payload. The sensor data payload includes a second portion of sensor data sensed by one or more sensors (not shown) at IoT device 100. App 120 at mobile device 110 may cause a PDU acknowledgement receipt message 720 to be transmitted to IoT device 100 using the short range wireless protocol. As further shown, IoT device 100 continues broadcasting advertising PDUs in the sequence of advertising PDUs, through the Nth PDU, which carries the last portion of the sensor data, and until the last N+1th PDU. As shown, IoT device 100 broadcasts a last N+1th advertising PDU 725 in the sequence of PDUs via the short range wireless protocol, where PDU 725 includes a sequence number=N+1, the MAC address of IoT device 100, a data type indicator, and an error detection code in place of the sensor data payload. The error detection code may include, for example, parity bits, a checksum, a cyclic redundancy check (CRC) code, or cryptographic hash code. The error detection code may be used at sensor data server 125 for performing error detection of the sequence of N advertising PDUs.

App 120 at mobile device 110 may cause a final PDU acknowledgement receipt message 730 to be transmitted to IoT device 100 using the short range wireless protocol. App 120, having accumulated 735 all of the advertising PDUs in the sequence of N+1 advertising PDUs, aggregates the accumulated PDUs in a single block and forwards the accumulated PDUs, the timestamp $t_1$, the IoT device location, and the error detection code, in a message 740 to sensor data server 125. Upon receipt of message 740, sensor data server 125 extracts 745 and stores the PDU data from the sequence of N+1 advertising PDUs, and associated data, in sensor data DB 135.

Figure 8A:
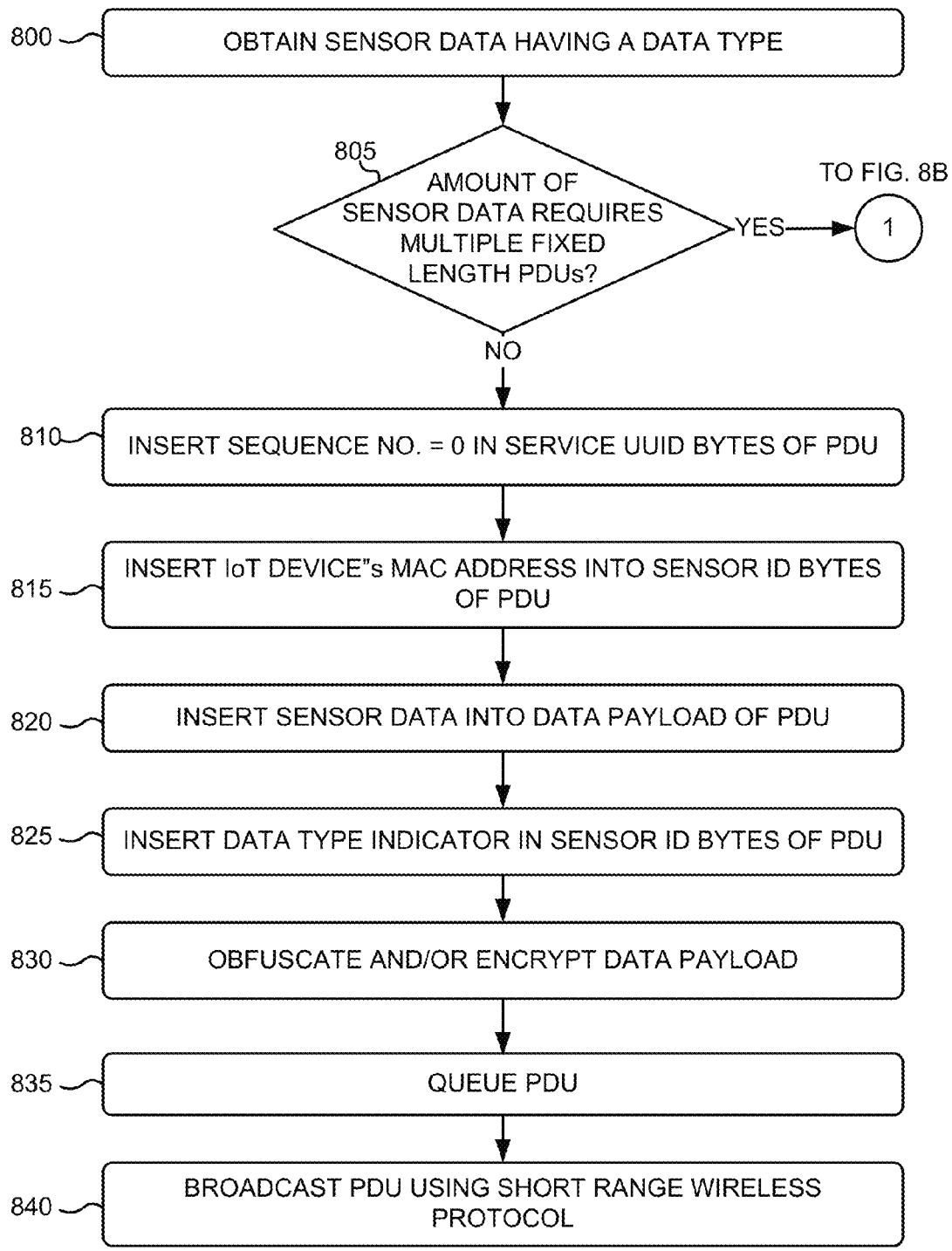
FIGS. 8A and 8B are flow diagrams illustrating an exemplary process for broadcasting sensor data, at an IoT device, via one or more advertising packet data units using a short range wireless protocol.
Figure 8B:
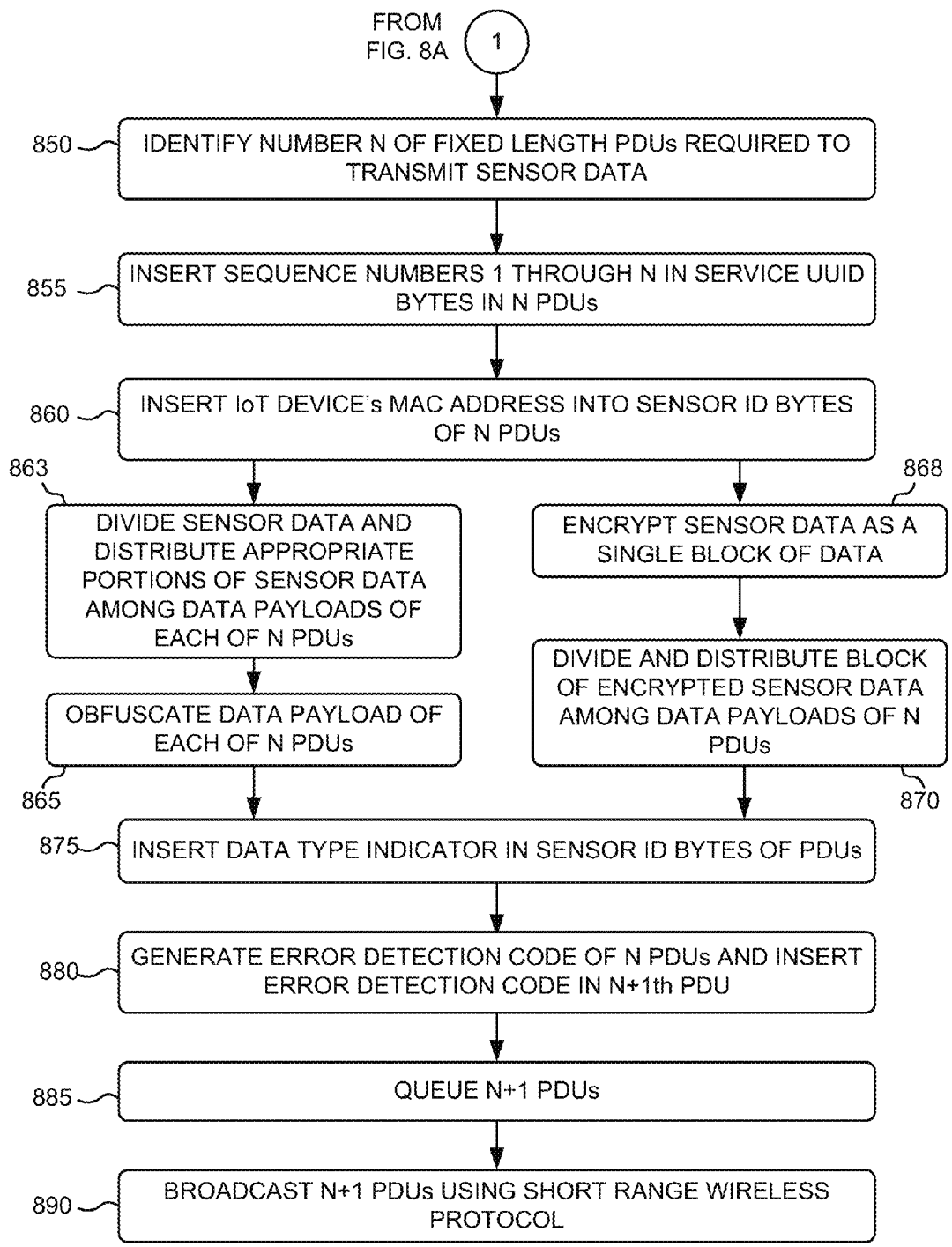

FIGS. 8A and 8B are flow diagrams illustrating an exemplary process for broadcasting sensor data, at IoT device 100, via one or more advertising PDUs using a short range wireless protocol. The exemplary process of FIGS. 8A & 8B may be implemented by IoT device 100. The exemplary process of FIGS. 8A and 8B may be described with reference to FIGS. 1-6.

The exemplary process includes IoT device 100 obtaining sensor data having a data type (block 800). One or more sensor devices associated with IoT device 100 may sense an aspect of the environment proximate to IoT device 100 and may generate sensor data. The one or more sensor devices may include, for example, a humidity sensor, a temperature sensor, a barometric pressure sensor, a wind speed sensor, and/or a digital camera. The data type of the sensor data may include, for example, humidity data, temperature data, barometric pressure data, wind speed data, or image data. The sensor data may include numeric data (e.g., a numeric temperature reading), textual data, or encoded image data.

IoT device 100 determines if an amount of the sensor data requires multiple fixed length PDUs for transmission (block 805). If IoT device 100 is using, for example, the advertising PDU frame format and length depicted in FIG. 4, then sensor data bytes 440 consist of only 6 bytes. Therefore, if the sensor data is six bytes or less, then only a single advertising PDU 115 may be required. However, if the sensor data has a quantity of data of seven bytes or greater, then the sensor data may need to be divided up into multiple sequential payloads and distributed among multiple sequential advertising PDUs 115.

When the amount of the sensor data doesn't require multiple fixed length PDUs (NO—block 805) (i.e., the sensor data fits into the data payload of a single PDU), IoT device 100 may insert a sequence number of zero into the service UUID bytes 420 of PDU 115 (block 810). In this implementation, the sequence number of zero indicates that only a single PDU 115 is being used to send the sensor data, instead of a sequence of multiple PDUs. Alternatively, no sequence number may be inserted into PDU 115, and the lack of a sequence number may be interpreted by the receiving mobile device 110 as the same as if the PDU 115 has a sequence number of zero. The sequence number may be inserted into other fields of advertising PDU 115, as long as the location of the sequence number within the bytes of PDU 115 can be consistently located.

IoT device 100 inserts IoT device's MAC address into sensor ID bytes 430 of PDU 115 (block 815). The original equipment manufacturer (OEM) may assign a permanent MAC address to IoT device 100 that is stored within a memory of IoT device 100. IoT device 100 may retrieve the MAC address from the memory, and insert the MAC address (e.g., a Bluetooth MAC address) into sensor ID bytes 430 of PDU 115. IoT device 100 inserts the sensor data, obtained in block 800, into the data payload (e.g., sensor data bytes 440) of PDU 115 (block 820). Sensor data bytes 440 of PDU 115 represent the data payload for purposes of broadcasting the sensor data. IoT device 100 inserts a data type indicator, indicating the data type of the sensor data, into the sensor ID bytes of PDU 115 (block 825). IoT device 100 identifies the data type of the sensor data based on the sensor from which the sensor data originated, and a data type indicator is assigned to the sensor data. Multiple different data type indicators may be applied consistently across IoT devices 100 such that each IoT device applies a same data type indicator to a same type of sensor data.

IoT device 100 may obfuscate and/or encrypt the data payload of PDU 115 (block 830). IoT device 100 may use various different logical operations and bit shifts, which can be reversed, to obfuscate the sensor data to be broadcast as the data payload of PDU 115. For example, the 6 bytes of the data payload of PDU 115 may be subjected to a series of XOR operations and one or more bit shifts to obfuscate the data payload. IoT device 100 may also use an encryption algorithm (in addition to obfuscation, or instead of) to encrypt the data payload of PDU 115. The encryption algorithm may include any type of encryption algorithm that can encrypt small quantities of data (e.g., 6 bytes).

IoT device 100 queues the generated PDU 115 for broadcasting (block 835). IoT device 100 may queue the generated PDU 115 in an internal memory for immediate broadcasting, or for broadcasting at a certain time (e.g., a certain periodic interval, at the occurrence of some event, etc.). IoT device 100 broadcasts PDU 115 using the short range wireless protocol (block 840). IoT device 100 uses its transceiver, which includes a short range low power transceiver, for broadcasting PDU 115 using the short range wireless protocol. In one implementation, the short range wireless protocol includes Bluetooth (e.g., Bluetooth 4.0). In some implementations, IoT device 100 may wait upon receipt of an acknowledgement message from a receiving mobile device 110, and if the acknowledgement message is not received within a certain time period, then IoT device 100 may re-broadcast PDU 115, and continue re-broadcasting, until such time as an acknowledgement message is received.

Returning to block 805, when IoT device 100 determines that the amount of sensor data requires multiple fixed length PDUs for transmission (YES—block 805)(i.e., the sensor data does not fit into a single fixed length PDU), IoT device 100 determines a number N of fixed length PDUs required to transmit the sensor data (block 850). For example, if advertising PDU 115 depicted in FIG. 4 is used for broadcasting the sensor data, then the quantity (q) of the sensor data is divided by the data payload size (i.e., size of sensor data bytes 440 is 6 bytes), with result being rounded up to the next highest integer, to determine the number N of fixed length advertising PDUs required to transmit the sensor data. As a specific example, if the sensor data includes 32 bytes of data, then 32/6=5.33333, which rounds up to N=6 PDUs being required to broadcast the 32 bytes of sensor data.

IoT device 100 inserts sequence numbers 1 through N in the service UUID bytes 420 in N PDUs 115 (block 855). The sequences numbers 1 through N identify the proper sequence of the PDUs for reconstructing the sensor data from the data payloads of the N PDUs 115. IoT device 100 inserts IoT device's MAC address into sensor ID bytes of the N PDUs 115 (block 860). IoT device 100 may retrieve the MAC address of IoT device 100, assigned by the OEM, from the memory, and insert the MAC address (e.g., a Bluetooth MAC address) into sensor ID bytes 430 of PDU 115.

In one implementation, depicted in blocks 863 and 865, IoT device 100 merely obfuscates the sensor data, not involving fully encrypting the data. In this implementation, IoT device 100 divides the sensor data and distributes appropriate portions of the sensor data among the data payloads of each of the N PDUs (block 863), and obfuscates the data payload of each of the N PDUs (block 865). IoT device 100 may use various different logical operations and bit shifts, which can be reversed, to obfuscate the sensor data in the data payloads of each of the N PDUs 115. For example, the 6 bytes of the data payload of each of the N PDUs 115 may be subjected to a series of XOR operations and one or more bit shifts to obfuscate the data payload.

In an alternate implementation, depicted in blocks 868 and 870, IoT device 100 performs a full encryption of the sensor data. In this implementation, IoT device 100 encrypts the sensor data as a single block of data (block 868), divides the encrypted data into N portions of encrypted data, and then distributes the N portions of encrypted sensor data among the data payloads of the N PDUs (block 870). In one implementation, the sensor data may be encrypted using the AES128 encryption algorithm. AES128 uses a 16 byte block size for encrypting data. The encryption algorithm, however, may include any type of encryption algorithm that can encrypt smaller quantities of data (e.g., 16 bytes).

IoT device 100 inserts a data type indicator, indicating the data type of the sensor data, into the sensor ID bytes of PDU 115 (block 875). IoT device 100 identifies the data type of the sensor data based on the sensor from which the sensor data originated, and a data type indicator is assigned to the sensor data. IoT device 100 generates an error detection code of the N PDUs, and inserts the error detection code in an N+1th advertising PDU (block 880). Any type of error detection algorithm, that generates any type of error detection code, may be used with the N PDUs including, for example, parity bits, checksums, CRC codes, and cryptographic hash codes.

IoT device 100 queues the N+1 PDUs (block 885), and broadcasts the N+1 PDUs using the short range wireless protocol (block 890). IoT device 100 may queue the generated N PDUs 115 in an internal memory for immediate broadcasting, or for broadcasting at a certain time (e.g., a certain periodic interval, at the occurrence of some event, etc.). IoT device 100 uses its transceiver, which includes a short range, low power transceiver, for broadcasting the N PDUs 115 using the short range wireless protocol. In some implementations, IoT device 100 may wait upon receipt of an acknowledgement message from a receiving mobile device 110 for each of the N PDUs 115, and if the acknowledgement message is not received within a certain time period, then IoT device 100 may re-broadcast each PDU 115 for which an acknowledgement message is not received, and continue re-broadcasting each PDU 115, until such time as an acknowledgement message is received for that PDU 115 of the N PDUs.

The exemplary process of FIGS. 8A and 8B may be executed each time sensor data becomes available at each of IoT devices 100-1 through 100-*x* (e.g., when an image at a traffic camera is taken), or may be executed over intervals of time at each of IoT devices 100-1 through 100-*x*. The intervals of time may be periodic, such as accumulating sensor data over a week or month (e.g., power usage at a home over a month), and then broadcasting the accumulated sensor data in one or more advertising PDUs. The intervals of time may also be aperiodic, such as when a condition(s) is met. For example, a specified number of sensor measurements (e.g., 10) may be accumulated over a variable period of time, and then the sensor data is broadcast in one or more advertising PDUs. Furthermore, blocks 850, 855, 860, 868, 870, 875, 880, 885 and 890 of the process of FIGS. 8A and 8B have been described with respect to broadcasting sensor data, from a single sensor measurement, having a quantity of data larger than fits within the data payload of a single advertising PDU (i.e., within sensor data bytes 440 of PDU 115). However, in other implementations, the sensor data from multiple sensor measurements may be combined into a single block, to satisfy the minimum byte block size of the encryption algorithm used (e.g., 16 bytes for AES128 encryption), encrypted using the encryption algorithm, divided up into N blocks of data, and distributed among the data payloads of the N advertising PDUs. Therefore, blocks 850, 855, 860, 868, 870, 875, 880, 885 and 890 of FIG. 8B may be performed to encrypt multiple sensor measurements as a single block of data, and broadcast in N advertising PDUs with the 1 to N sequence numbers (i.e., block 855) linking the N advertising PDUs such that the encrypted data distributed among the data payloads of the N advertising PDUs may subsequently be recombined, and then decrypted.

Figure 9A:
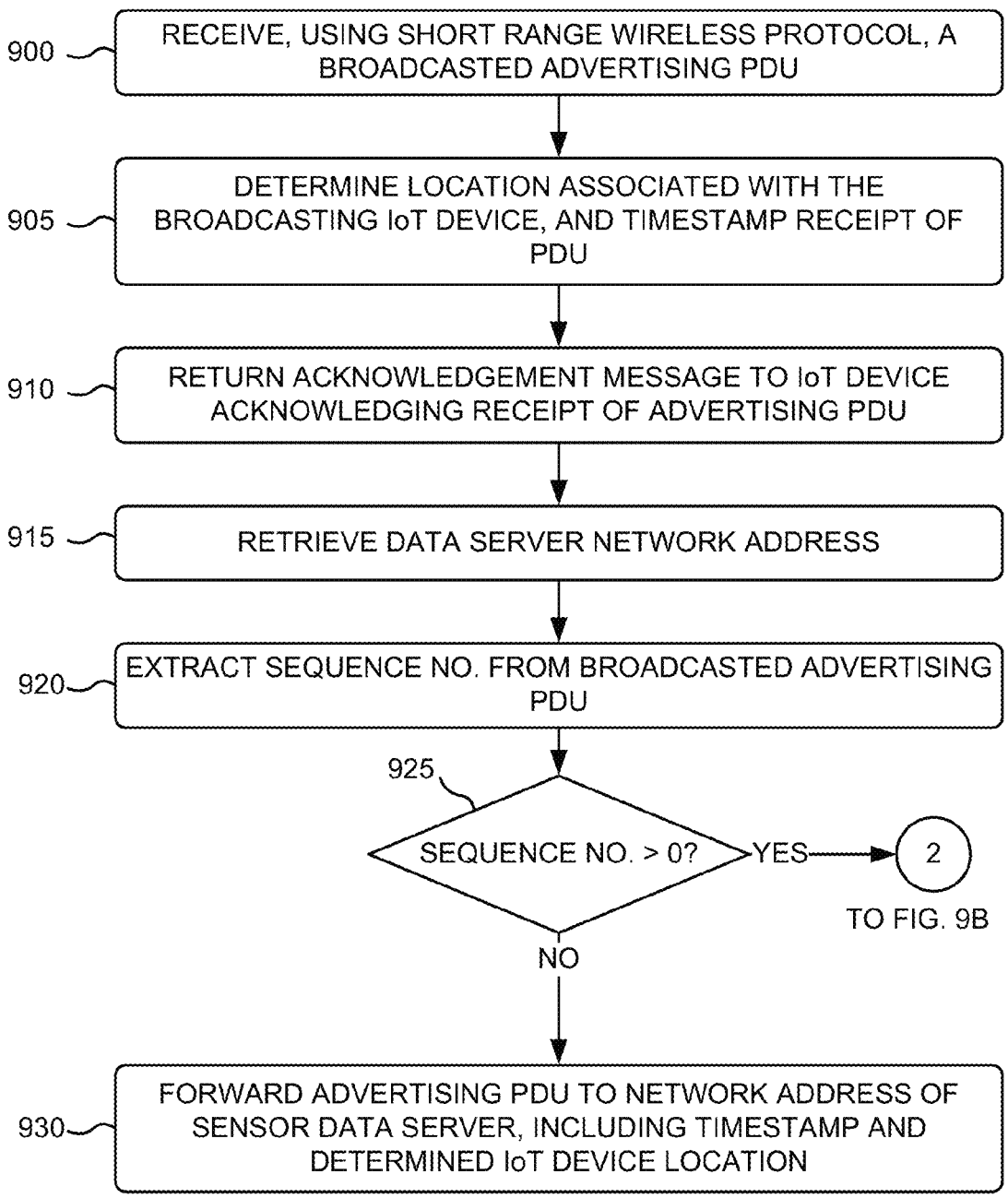
FIGS. 9A and 9B are flow diagrams illustrating an exemplary process for receiving broadcasted advertising packet data units, at a mobile device, and for forwarding the packet data units, and associated data, from the mobile device to a sensor data server.
Figure 9B:
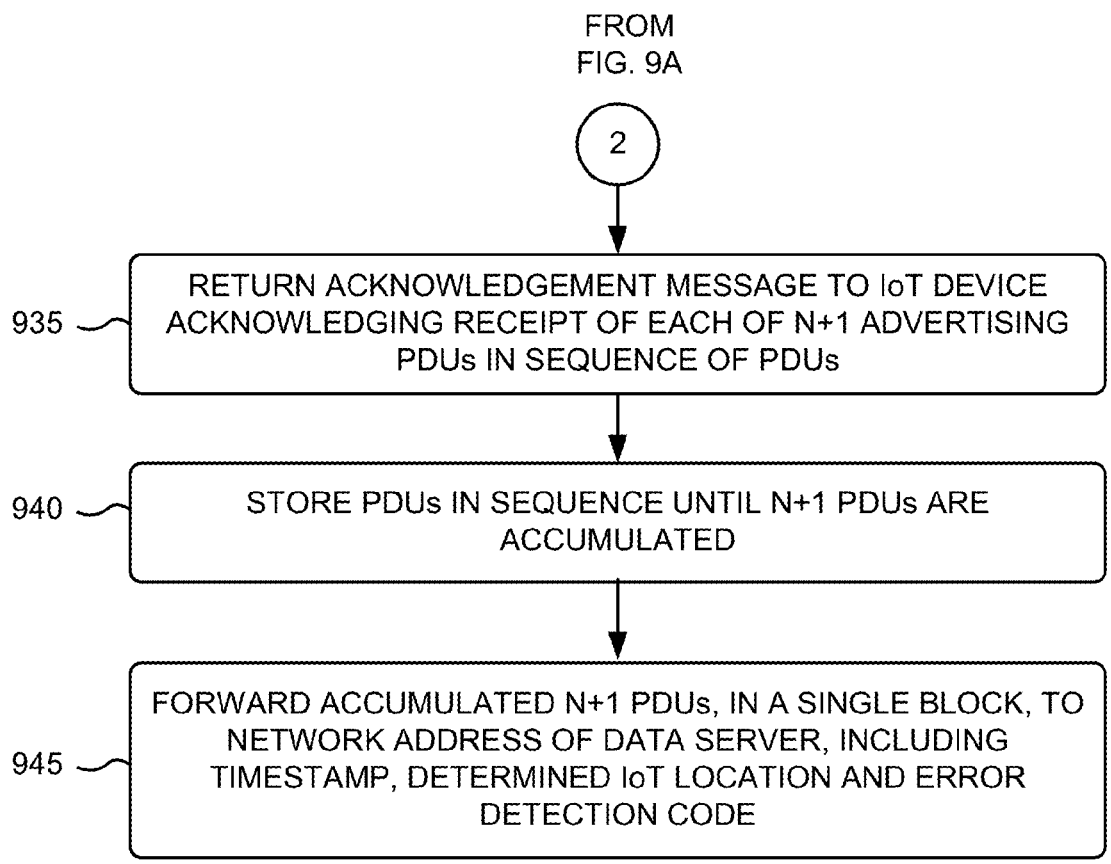

FIGS. 9A and 9B are flow diagrams illustrating an exemplary process for receiving broadcasted advertising PDUs, at a mobile device 110, and for forwarding the PDUs, and associated data, from mobile device 110 to sensor data server 125. The exemplary process of FIGS. 9A & 9B may be implemented by app 120 at mobile device 110. The exemplary process of FIGS. 9A and 9B may be described with reference to FIGS. 1-6.

The exemplary process includes app 120 at mobile device 110 receiving, using a short range wireless protocol, an advertising PDU from an IoT device 100 (block 900). The short range wireless protocol may include, for example, Bluetooth. Other types of short range wireless protocols may, however, be used (e.g., Insteon, IrDA, Wireless USB, Z-Wave, ZigBee, and/or a BAN). App 120 at mobile device 110 determines a geographic location associated with the broadcasting IoT device 100, and timestamps the receipt of the advertising PDU (block 905). The geographic location determining component of mobile device 110 (e.g., GPS component) may determine the geographic location of mobile device 110 and provide the geographic location to app 120.

App 120 at mobile device 110 returns an acknowledgement message, using the short range wireless protocol, to IoT device 100 acknowledging receipt of the advertising PDU (block 910). App 120 causes the low power, short range wireless transceiver of mobile device 110 to send, using the short range wireless protocol, the message that acknowledges receipt of the advertising PDU. Returning of the acknowledgement message may be optional in certain instances. For example, an IoT device 100 that transmits sensor data on a continuous basis may not require the return of acknowledgement messages for each transmitted advertising PDU. App 120 at mobile device 110 retrieves the network address of sensor data server 125 (block 915). App 120 at mobile device 110 may previously have identified the network address of sensor data server 125 such as, for example, when app 120 was downloaded onto mobile device 110.

App 120 at mobile device 110 extracts the sequence number from the broadcasted advertising PDU (block 920), and determines if the sequence number has a value greater than zero (block 925). If the value of the sequence number is not greater than zero, or if the PDU has no sequence number (i.e., indicating only a single broadcasted PDU), then app 120 at mobile device 110 forwards the advertising PDU, along with the timestamp and the determined IoT device location, to the network address of sensor data server 125 (block 930). For example, app 120 causes the wireless cellular transceiver of mobile device 110 to send a message, using a cellular network protocol, which includes the forwarded advertising PDU, the timestamp and the determined IoT device location.

Returning to block 925, when App 120 at mobile device 110 determines that the value of the extracted sequence number of the PDU is greater than zero (YES—block 925) (i.e., indicating a broadcasted sequence of linked PDUs containing a sensor data payload), app 120 at mobile device 110 returns an acknowledgement message to the IoT device acknowledging receipt of each of the N+1 advertising PDUs in the sequence of advertising PDUs (block 935), and stores the broadcasted PDUs in sequence until the N+1 PDUs in the sequence are accumulated (block 940). Similar to block 900, app 120 at mobile device 110 receives, using the short range wireless protocol, each of the N+1 advertising PDUs, and returns an acknowledgment message, using the short range wireless protocol, for each PDU in the sequence of N+1 PDUs received. As each of the N+1 PDUs is received at mobile device 110, app 120 causes the PDU to be stored in memory until all N+1 PDUs (as indicated by the sequence number of each of the received PDUs) have been received.

App 120 at mobile device 110 forwards the accumulated N+1 PDUs, in a single block, to the network address of sensor data server 125, including the timestamp, the determined location of the IoT device, and the error detection code contained in the N+1th broadcasted PDU (block 945). The error detection code contained in the N+1th PDU includes the error detection code generated by the IoT device 100 in block 880 of FIG. 8B.

The exemplary process of FIGS. 9A and 9B may be executed for each single broadcasted advertising PDU, containing sensor data, or for each sequence of N+1 broadcasted advertising PDUs, containing sensor data, received by each app 120-1 through 120-m at mobile devices 110-1 through 110-m.

Figure 10A:
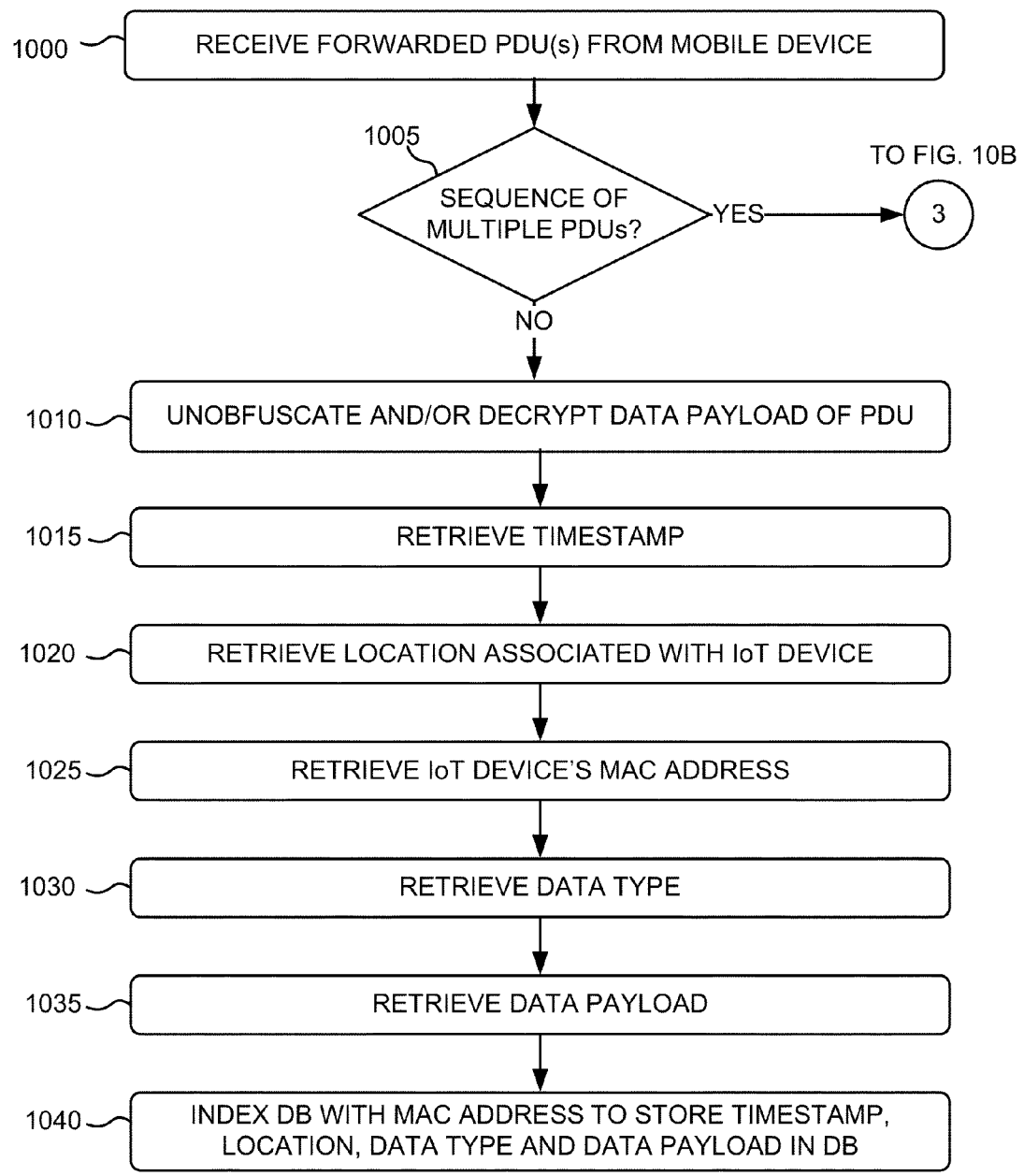
FIGS. 10A and 10B are flow diagrams illustrating an exemplary process for receiving forwarded advertising packet data units, and associated data, at a sensor data server from a mobile device and for storing the data from the packet data units in a sensor data database.
Figure 10B:
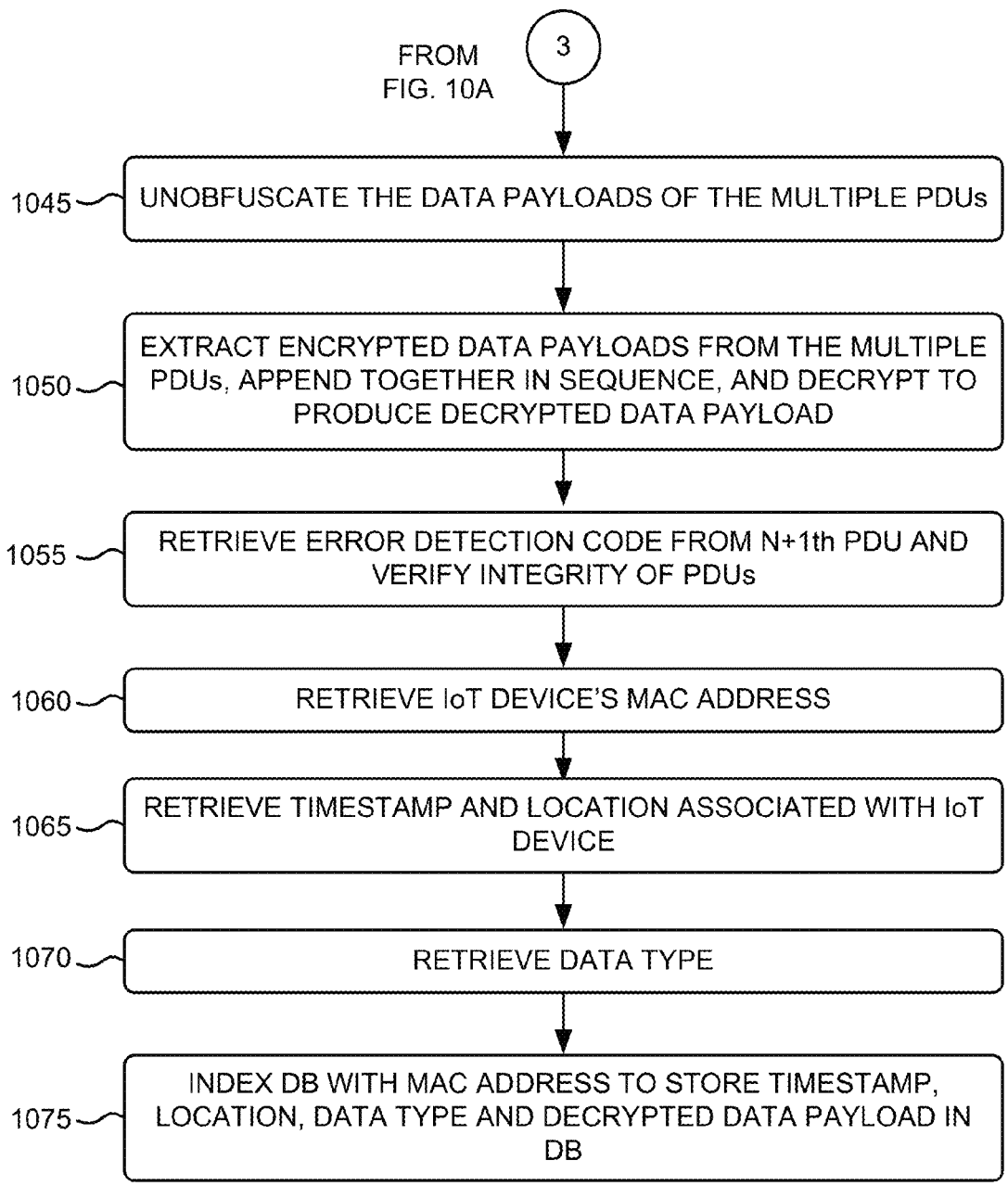

FIGS. 10A and 10B are flow diagrams illustrating an exemplary process for receiving forwarded advertising PDUs, and associated data, at sensor data server 125 from a mobile device and for storing the data from the PDUs and the associated data in sensor data DB 135. The exemplary process of FIGS. 10A & 10B may be implemented by sensor data server 125 in conjunction with sensor data DB 135. The exemplary process of FIGS. 10A and 10B may be described with reference to FIGS. 1-6.

The exemplary process includes sensor data server 125 receiving forwarded PDU(s) from mobile device 110, including a timestamp and location data associated with the IoT device that originally broadcasted the PDU(s) (block 1000). A mobile device 110 that received, via the short range wireless protocol, the original broadcast(s) of the advertising PDU, or a sequence of advertising PDUs, may insert the PDU(s) in a message, along with the timestamp and the location data, and forward to sensor data server 125 via network 130. Upon receipt, sensor data server 125 may temporarily store the received message for processing of the content of the message.

Sensor data server 125 determines if the PDU(s) includes a sequence of multiple PDUs (block 1005). Sensor data server 125 may extract one or more PDUs from the message received from the mobile device 110, and may retrieve the sequence number(s) inserted into the PDUs. When the message includes a sequence of multiple PDUs, sensor data server 125 retrieves the sequence numbers and re-orders (if necessary) the corresponding PDUs in an order that accords with the sequence numbers. When the PDU includes only a single forwarded PDU (NO—block 1005), sensor data server 125 unobfuscates and/or decrypts the data payload of the PDU (block 1010). When unobfuscating the data payload of the PDU, sensor data server 125 may perform the various different logical operations and bit shifts, performed by the IoT device 100 (block 830 of FIG. 8A), in a reverse order to obtain the original sensor data. When decrypting the data payload of the PDU, sensor data server 125 may use the counterpart decryption algorithm that corresponds to the encryption algorithm used by IoT device 100 to encrypt the data payload (block 830 of FIG. 8A).

Sensor data server 125 retrieves the timestamp (block 1015) and the location associated with the IoT device from the received message (block 1020). The timestamp includes the timestamp obtained by mobile device 110 when the advertising PDU was originally broadcast by IoT device 100 and received at mobile device 110 (i.e., block 905 of FIG. 9A). The location associated with the IoT device includes the geographic location obtained by mobile device 110 when the advertising PDU was originally broadcast by IoT device 100 and received at mobile device 110.

Sensor data server 125 further retrieves the IoT device's MAC address (block 1025), the data type of the data payload (block 1030), and the data payload from the forwarded PDU (block 1035). Sensor data server 125 may retrieve the IoT device's MAC address and the data type indicator from sensor ID bytes 430 of advertising PDU 115, and the sensor data data payload from sensor data bytes 440 of advertising PDU 115. Sensor data server 125 indexes sensor data DB 135 with the IoT device's MAC address to store the timestamp, the location associated with the IoT device, the data type, and the data payload in sensor data DB 135 (block 1040). Sensor data server 125 stores the MAC address retrieved from the advertising PDU in IoT device MAC address field 510, the retrieved timestamp in timestamp field 520, the retrieved location in IoT device location field 530, the retrieved data type in data type field 540, and the retrieved payload sensor data in data payload field 550 of an entry of sensor data DB 135.

Returning to block 1005, when sensor data server 125 determines that the PDU(s) includes a sequence of multiple PDUs (YES—block 1005), sensor data server 125 unobfuscates the data payloads of the multiple PDUs (block 1045). Blocks 1045 and block 1050 may be alternatives to one another (i.e., only block 1045 performed, or only block 1050 performed), or these blocks may be performed together in sequence, as depicted in FIG. 10B. When unobfuscating the data payload of the PDU, sensor data server 125 may perform the various different logical operations and bit shifts, performed by the IoT device 100 (block 830 of FIG. 8A), in a reverse order to obtain the original sensor data.

Sensor data server 125 extracts the encrypted data payloads from the multiple PDUs, appends the data payloads together in sequence, and decrypts the appended data payloads as a single block of data (block 1050). Sensor data server 125, therefore, reconstructs the encrypted sensor data divided up by the broadcasting IoT device 100 (i.e., blocks 868 and 870 of FIG. 8B) by appending the multiple data payloads to one another in the sequenced identified by the sequence numbers inserted in each of the PDUs, and uses the counterpart decryption algorithm, that corresponds to the encryption algorithm used by IoT device 100, to decrypt the data payload (block 868 of FIG. 8B).

Sensor data server 125 retrieves an error detection code from the N+1th PDU of the sequence of multiple PDUs and verifies the integrity of the PDUs based on the error detection code (block 1055). Sensor data server 125 uses an appropriate error detection algorithm that corresponds to the type of error detection code retrieved from the N+1th PDU. The error detection code may include, for example, parity bits, checksums, CRC codes, and cryptographic hash codes.

Sensor data server 125 retrieves the IoT device's MAC address (block 1060), the timestamp and location associated with the IoT device (block 1065), and the data type (block 1070) from the PDUs. Sensor data server 125 retrieves the IoT device's MAC address and the data type indicator from sensor ID bytes 430 of the PDUs 115, and the timestamp and the location from the message forwarded from the mobile device 110. The timestamp includes the timestamp obtained by mobile device 110 when the advertising PDUs were originally broadcast by IoT device 100 and received at mobile device 110 (i.e., block 905 of FIG. 9A). The location associated with the IoT device includes the geographic location obtained by mobile device 110 when the advertising PDUs were originally broadcast by IoT device 100 and received at mobile device 110.

Sensor data server 125 indexes sensor data DB 135 with the IoT device's MAC address to store the timestamp, the location associated with the IoT device, the data type, and the decrypted data payload in sensor data DB 135 (block 1075). Sensor data server 125 stores the MAC address retrieved from the advertising PDUs in IoT device MAC address field 510, the retrieved timestamp in timestamp field 520, the retrieved location in IoT device location field 530, the retrieved data type in data type field 540, and the decrypted payload sensor data in data payload field 550 of an entry of sensor data DB 135.

The exemplary process of FIGS. 10A and 10B may be executed for each message containing a forwarded advertising PDU, or sequence of advertising PDUs received at sensor data server 125.

Figure 11:
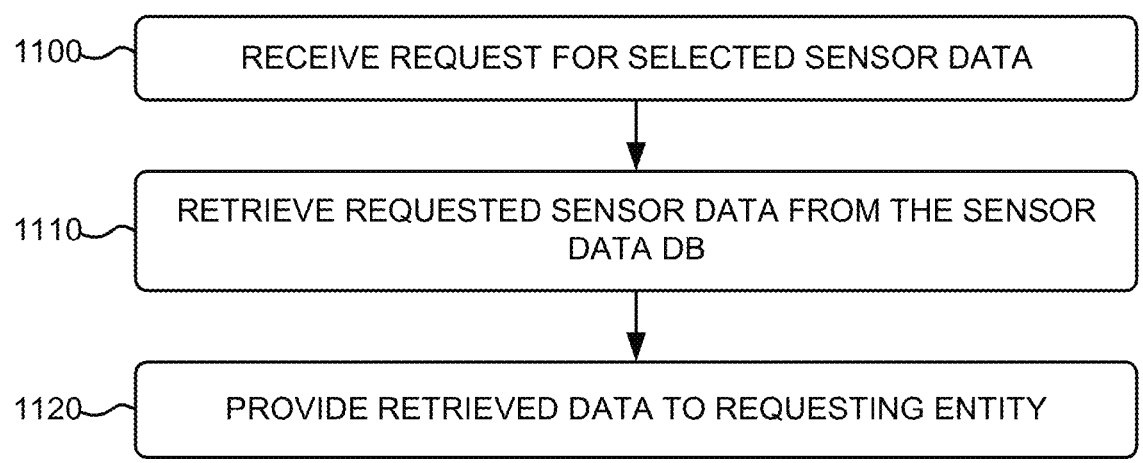
FIG. 11 is a flow diagram illustrating an exemplary process for retrieving sensor data from a sensor data database based on a request for selected sensor data from an entity.

FIG. 11 is a flow diagram illustrating an exemplary process for retrieving sensor data from sensor data DB 135 based on a request for selected sensor data from an entity 140. The exemplary process of FIG. 11 may be implemented by sensor data server 125 in conjunction with sensor data DB 135. The exemplary process of FIG. 11 may be described with reference to FIGS. 1-6.

The exemplary process includes sensor data server 125 receiving a request for selected sensor data from an entity 140 (block 1100). One of entities 140-1 through 140-*n* may send a request, via a network device and network 130, to sensor data server 125 that requests sensor data satisfying certain search criteria. For example, the request may request sensor data from data payload fields 550 of entries 500 of sensor data DB 135 having a certain IoT MAC address or addresses in IoT device MAC address fields 510. The requests from entities 140-1 through 140-*n* may include any combination of search criteria (e.g., timestamp, location, data type, timestamp and location, IoT MAC address and data type, etc.) for retrieving specific sensor data from data payload field(s) 550 of sensor data DB 135.

Sensor data server 125 retrieves the requested sensor data from sensor data DB 135 (block 1110). Sensor data server 125 may use the search criteria to locate entries 500 of sensor data DB 135 that match the search criteria, and to retrieve sensor data from the corresponding data payload fields 550 of those located entries 500. For example, the search criteria may be sensor data close to a specific geographic location during a particular period of time, and sensor data server 125 may compare the search criteria with the contents of timestamp field 520 and IoT device location field 530 of the entries in sensor data DB 135 to identify entries 500 that match the search criteria. Sensor data server 125 then retrieves the sensor data from data payload fields 550 of the identified entries 500 that match the search criteria. Sensor data server 125 provides the retrieved data to the requesting entity (block 1120). Sensor data server 125 may, in a "push" implementation, send one or more messages via network 130 that include the requested sensor data to a network device associated with the requesting entity 140. Sensor data server 125 may, in a "pull" implementation, enable entity 140 to retrieve the requested data via, for example, an on-line web-site.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 8A, 8B, 9A, 9B, 10A, 10B and 11, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
  installing an application on a mobile device;
  executing the application to detect a number N sequentially-linked broadcasted advertising packet data units (PDUs) via a short range wireless protocol, wherein each of the N sequentially-linked broadcasted advertising PDUs carries a sensor data payload that is a portion of a quantity Q of sensor data corresponding to at least one sensor measurement;
  receiving, at the mobile device, a first broadcasted advertising PDU of the N sequentially-linked broadcasted advertising PDUs, via the short range wireless protocol from a first Internet of Things (IoT) device;
  determining, by the application, a first geo-location associated with the first IoT device;
  generating, by the application, a first timestamp based on receipt of the first broadcasted advertising PDU;
  extracting, from the first broadcasted advertising PDU, a sequence number inserted into the first broadcasted advertising PDU by the first IoT device;
  determining whether the sequence number is equal to N;
  storing, based on a determination that the sequence number is not equal to N, the first broadcasted advertising

PDU in sequence until each of the N sequentially-linked broadcasted advertising PDUs is accumulated; and forwarding, by the application from the mobile device via a wireless protocol that is different than the short range wireless protocol, the first broadcasted advertising PDU, the first geo-location, and the first timestamp to a remote network device in a block of data including the accumulated N sequentially-linked broadcasted advertising PDUs.

2. The method of claim 1, wherein the sensor data is related to a parameter or a condition detected by a sensor at the first IoT device.

3. The method of claim 2, wherein the at least one sensor measurement comprises multiple measurements of the parameter or the condition at different points in time.

4. The method of claim 1, wherein the wireless protocol that is different than the short range wireless protocol comprises a Wi-Fi protocol.

5. The method of claim 1, wherein the wireless protocol that is different than the short range wireless protocol comprises a cellular network protocol.

6. The method of claim 1, wherein for each of the N sequentially-linked broadcasted advertising PDUs having a sequence number that is less than N, a size of the sensor data payload is the same.

7. The method of claim 1, wherein the sensor data comprises image data, temperature data, wind speed data, barometric pressure data, power usage data, or humidity data.

8. The method of claim 1, wherein the first broadcasted advertising PDU comprises a BLUETOOTH advertising PDU.

9. The method of claim 1, wherein the short range wireless protocol comprises a wireless protocol associated with Bluetooth, Insteon, Infrared Data Association (IrDA), wireless Universal Serial Bus (USB), Z-Wave, ZigBee, or Body Area Network (BAN).

10. The method of claim 1, wherein the mobile device comprises one of a cellular telephone; a smart phone; a personal digital assistant (PDA); a laptop, palmtop or tablet computer; a gaming device; a media player device; or a digital camera.

11. A non-transitory storage medium storing instructions executable by a computational device, wherein the instructions comprise instructions to:

receive, at a mobile device, a first broadcasted advertising packet data unit (PDU), of a number N sequentially-linked broadcasted advertising PDUs transmitted via a short range wireless protocol from a first Internet of Things (IoT) device, wherein each of the N sequentially-linked broadcasted advertising PDUs carries a sensor data payload that is a portion of a quantity Q of sensor data corresponding to at least one sensor measurement;

determine a first geo-location associated with the first IoT device;

generate a first timestamp based on receipt of the first broadcasted advertising PDU;

extract, from the first broadcasted advertising PDU, a first sequence number inserted into the first broadcasted advertising PDU by the first IoT device;

determine whether the first sequence number is equal to N;

store, based on a determination that the first sequence number is not equal to N, the first broadcasted advertising PDU in sequence;

receive, at the mobile device, a second broadcasted advertising PDU transmitted via the short range wireless protocol from the first IoT device;

extract, from the second broadcasted advertising PDU, a second sequence number inserted into the second broadcasted advertising PDU by the first IoT device;

determine whether the second sequence number is equal to N; and forward, based on a determination that the second sequence number is equal to N and via a wireless protocol that is different than the short range wireless protocol, the first broadcasted advertising PDU and the second broadcasted advertising PDU to a remote network device in a single block of data.

12. The non-transitory storage medium of claim 11, wherein the wireless protocol that is different than the short range wireless protocol comprises a Wi-Fi protocol.

13. The non-transitory storage medium of claim 11, wherein each of the first and second advertising PDUs comprise a BLUETOOTH advertising PDU.

14. The non-transitory storage medium of claim 11, wherein the short range wireless protocol comprises a Bluetooth, Insteon, Infrared Data Association (IrDA), wireless Universal Serial Bus (USB), Z-Wave, ZigBee, or Body Area Network (BAN) wireless protocol.

15. A mobile device, comprising:

a first wireless transceiver configured to communicate via a low power, short range wireless protocol and to receive a first broadcasted advertising packet data unit (PDU), of a number N sequentially-linked broadcasted advertising PDUs, via the short range wireless protocol from a first Internet of Things (IoT) device;

a second wireless transceiver configured to communicate via a wireless protocol that is different than the short range wireless protocol; and a processing unit configured to execute an application to detect the N sequentially-linked broadcasted advertising PDUs via the short range wireless protocol, wherein each of the N sequentially-linked broadcasted advertising PDUs carries a sensor data payload that is a portion of a quantity Q of sensor data obtained corresponding to at least one sensor measurement, and wherein the processing unit is further configured to:

determine a first geo-location associated with the first IoT device, generate a first timestamp based on receipt of the first broadcasted advertising PDU, extract, from the first broadcasted advertising PDU, a sequence number inserted into the first broadcasted advertising PDU by the first IoT device, determine whether the sequence number is equal to N, store, based on a determination that the sequence number is not equal to N, the first broadcasted advertising PDU in sequence until each of the N sequentially-linked broadcasted advertising PDUs is accumulated; and forward, via the second wireless transceiver and the wireless protocol that is different than the short range wireless protocol, the first broadcasted advertising PDU, the first geo-location, and the first timestamp to a remote network device in a single block of data including the accumulated N sequentially-linked broadcasted advertising PDUs.

16. The device of claim 15, wherein the sensor data is related to a parameter or condition detected by a sensor at the first IoT device.

17. The device of claim 16, wherein the at least one sensor measurement comprises multiple measurements of the parameter or the condition at different points in time.

18. The device of claim 15, wherein the short range wireless protocol comprises a wireless protocol associated with Bluetooth, Insteon, Infrared Data Association (IrDA), wireless Universal Serial Bus (USB), Z-Wave, ZigBee, or Body Area Network (BAN), and wherein the wireless protocol that is different than the short range wireless protocol comprises a Wi-Fi protocol or a cellular network protocol.

19. The device of claim 15, wherein for each of the N sequentially-linked broadcasted advertising PDUs having a sequence number that is less than N, a size of the sensor data payload is the same.

20. The device of claim 15, wherein the sensor data comprises image data, temperature data, wind speed data, barometric pressure data, power usage data, or humidity data, and wherein the first broadcasted advertising PDU comprises a BLUETOOTH advertising PDU.

* * * * *